& Naughton

United States Patent [19]

Kikuta et al.

[11] Patent Number: 5,628,009

[45] Date of Patent: May 6, 1997

[54] INFORMATION RETRIEVAL SYSTEM USING HIERARCHICAL DATA-MANAGEMENT FUNCTION

[75] Inventors: Yasuyo Kikuta; Akira Murata; Masaki Hiraga, all of Kawasaki, Japan

[73] Assignee: Fujitsu Limited, Kawasaki, Japan

[21] Appl. No.: 531,829

[22] Filed: Sep. 22, 1995

Related U.S. Application Data

[63] Continuation of Ser. No. 196,849, Feb. 15, 1994, abandoned.

[30] Foreign Application Priority Data

Apr. 14, 1993 [JP] Japan .................................. 5-087480

[51] Int. Cl.⁶ .............................. G06F 17/30; G06F 12/08
[52] U.S. Cl. ................ 395/610; 395/185.08; 395/200.06; 395/611
[58] Field of Search .................................. 395/600, 575, 395/650, 800, 425

[56] References Cited

U.S. PATENT DOCUMENTS

| | | | |
|---|---|---|---|
| 3,670,310 | 6/1972 | Bharwani et al. | 340/172.5 |
| 4,468,728 | 8/1984 | Wang | 395/600 |
| 4,701,756 | 10/1987 | Burr | 340/825.02 |
| 4,805,134 | 2/1989 | Calo et al. | 395/600 |
| 4,809,362 | 2/1989 | Claus et al. | 359/120 |
| 5,018,139 | 5/1991 | Despres | 370/94.3 |
| 5,077,554 | 12/1991 | Orita et al. | 340/825.2 |
| 5,093,779 | 3/1992 | Sakurai | 395/600 |
| 5,204,955 | 4/1993 | Kagei et al. | 395/575 |
| 5,218,646 | 6/1993 | Sirat et al. | 382/14 |
| 5,218,673 | 6/1993 | Fujiwara | 396/164 |
| 5,261,044 | 11/1993 | Dev et al. | 395/159 |
| 5,263,157 | 11/1993 | Janis | 395/725 |
| 5,276,899 | 1/1994 | Neches | 395/800 |
| 5,295,154 | 3/1994 | Meier et al. | 375/1 |
| 5,295,244 | 3/1994 | Dev et al. | 395/161 |
| 5,299,207 | 3/1994 | Fujii | 371/29.1 |
| 5,361,349 | 11/1994 | Sugita et al. | 395/600 |
| 5,369,778 | 11/1994 | Soucie et al. | 395/800 |
| 5,428,774 | 6/1995 | Takahashi et al. | 395/600 |

FOREIGN PATENT DOCUMENTS 4-97454   3/1992   Japan.

*Primary Examiner*—Thomas G. Black
*Assistant Examiner*—Cheryl Lewis
*Attorney, Agent, or Firm*—Armstrong, Westerman, Hattori, McLeland & Naughton

[57] ABSTRACT

A general-information storing unit stores general information sets which are managed by a general-information managing unit which is provided in a network. A plurality of sectional-information storing units store respective sectional information sets which are managed by respective ones of a plurality of sectional-information managing units. The plurality of sectional-information managing units are provided in the network. A plurality of personal-information storing units store respective personal information sets which are managed by respective ones of a plurality of personal-information managing units. The plurality of personal-information managing units are provided in the network. An automatic retrieval unit retrieves a predetermined information unit from among the general information sets, sectional information sets, and personal information sets, in response to a relevant retrieval command being input to said information retrieval system. This retrieval is achieved by searching the above information units in either a bottom-up manner or a top-down manner using directory information for managing all the above information units hierarchically.

23 Claims, 40 Drawing Sheets

MAIN ROUTINE IN FIRST EMBODIMENT

KEYWORD SEARCH PROCESSING (S30)

SEARCH-REQUEST RECEPTION PROCESSING (S37)

SEARCH-RESULT RECEPTION PROCESSING (S40)

FIG.17 SECOND MODIED EXAMPLE OF FIRST EMBODIMENT

FIG. 18  THIRD MODIED EXAMPLE OF FIRST EMBODIMENT

MAIN ROUTINE (FIRST OF TWO) IN SECOND EMOBODIMENT

MAIN ROUTINE (SECOND OF TWO) OF SECOND EMBODIMENT

SEARCH REQUEST PROCESSING (S54)

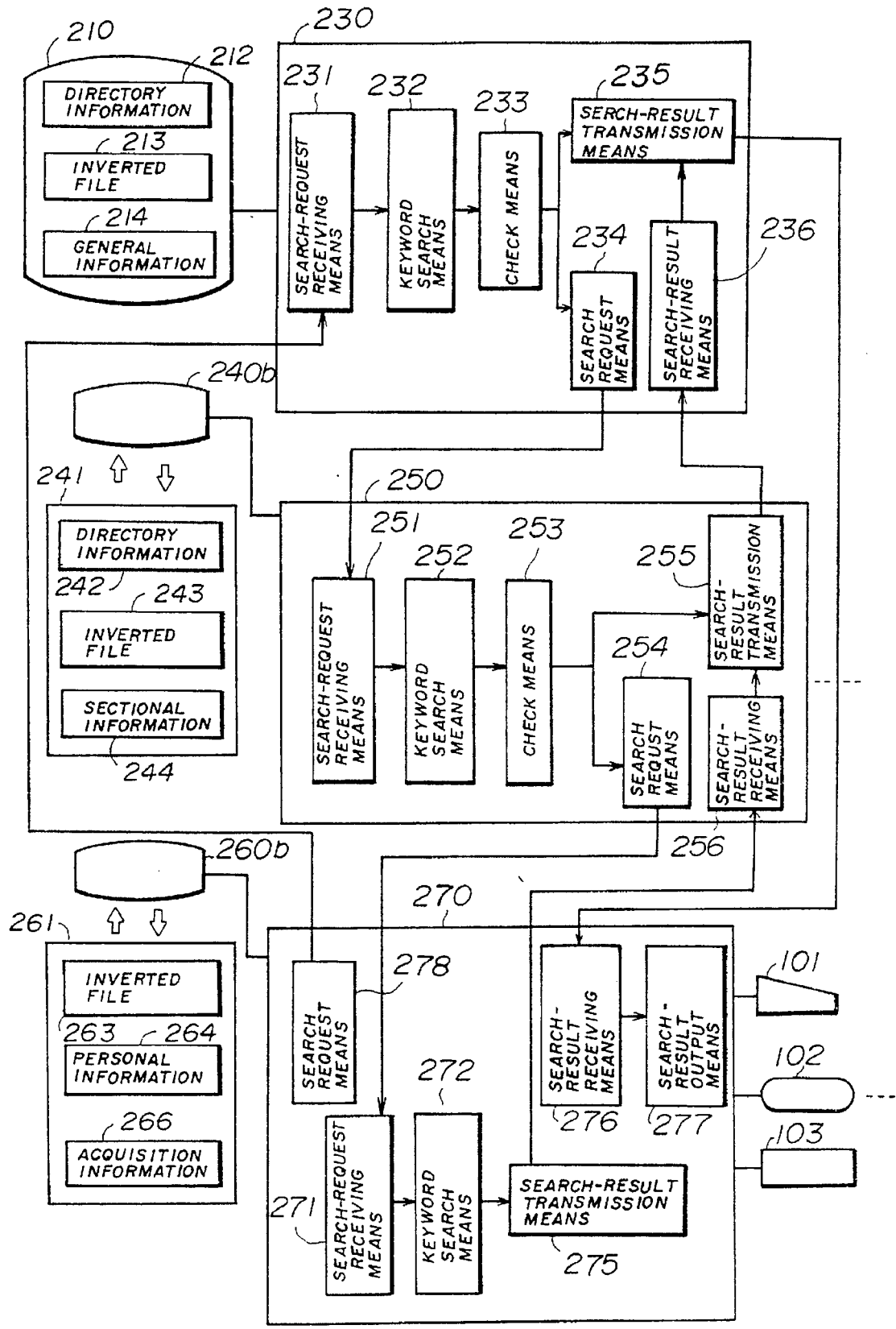
FIG.39  SECOND MODIFIED EXAMPLE OF SECOND EMBODIMENT

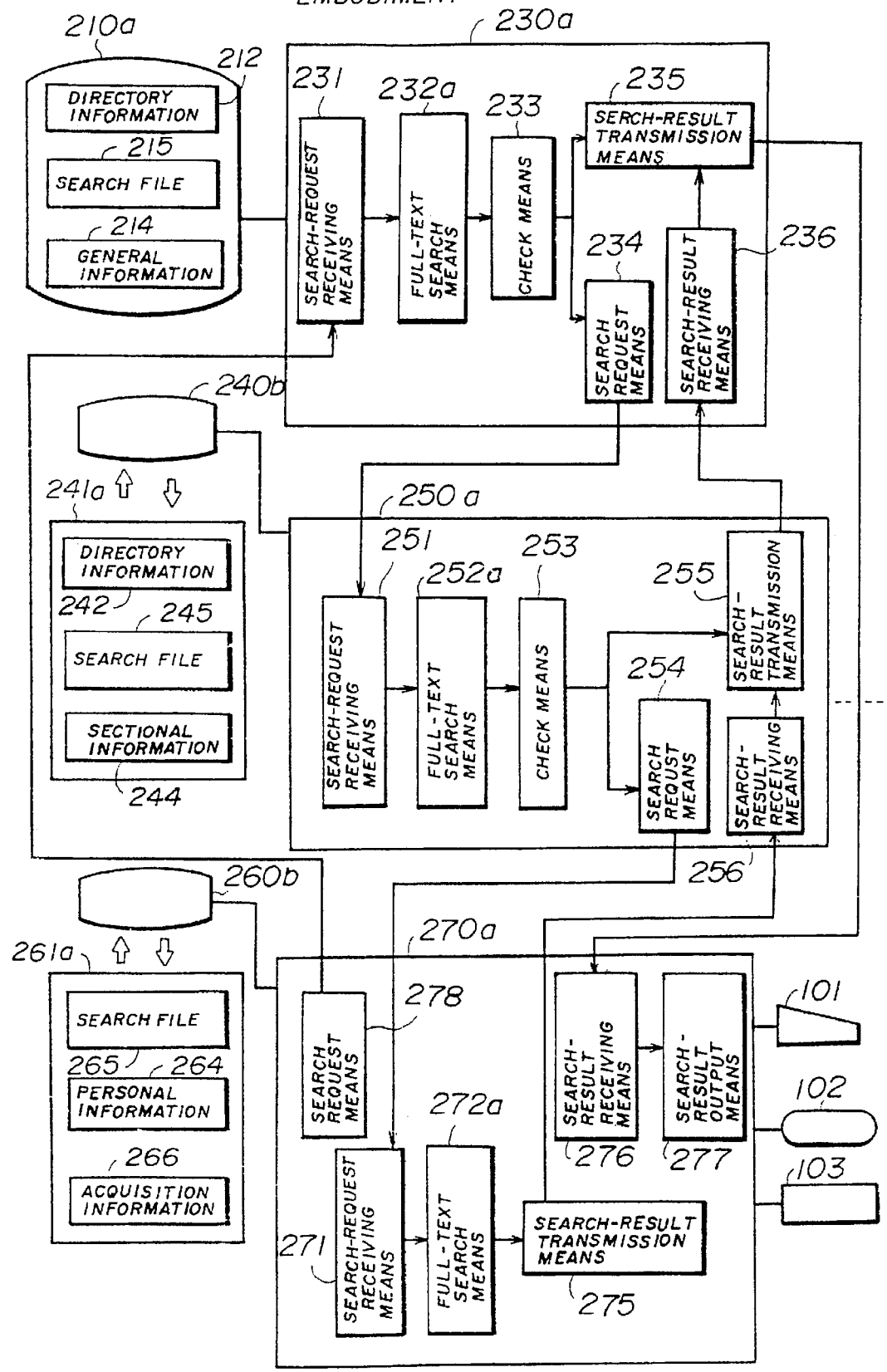
FIG.40 — THIRD MODIFIED EXAMPLE OF SECOND EMBODIMENT

INFORMATION RETRIEVAL SYSTEM USING HIERARCHICAL DATA-MANAGEMENT FUNCTION

This application is a continuation application Ser. No. 08/196,849 filed Feb. 15, 1994, now abandoned.

BACKGROUND OF THE INVENTION

1. The Field of the Invention

The present invention relates to an information retrieval system and in particular relates to an information retrieval system to be used for networked information processing system.

Recently, it is desired in large firms to form therein networked and hierarchically constructed information processing systems. Such information processing systems enhance the information-orientation of the firms. Further, an information retrieval system is also desired, which system has flexibility such that an information retrieval for the above type of information systems may be easily and efficiently performed.

2. The Related Art

A networked information processing system has the following construction, for example: There is an general-information server apparatus which manages general information concerning the entirety of a firm. There are further sectional-information server apparatuses, which manage sectional information used in each section, that is each part of the firm. This sectional information comprises a partial set of the above general information, for example. There are further personal-information server apparatuses, which manage personal information which each employee has, the employee belonging to a section of the firm. This personal information comprises a partial set of either the above general information or the above sectional information, for example. Then, these general-information server apparatus, sectional-information server apparatuses and personal-information server apparatuses are interconnected through a line network such as a Local Area Network (LAN, hereinafter).

An information retrieval system in the related art for such a networked information processing system will now be described. In the retrieval system, an information unit which a user desires to obtain is directly accessed.

Such a retrieval system may be implemented by a command provided in an operating system employed in an on-the-market personal computer or workstation, for example. Further, such a retrieval system may comprise a utility function of an on-the-market full-screen editor. However, since the retrieval speed in such retrieval systems is not fast, a search system such as that referred to as a keyword search or that referred to as a full-text search is devised so that improvement of the retrieval speed is obtained.

In order to implement the keyword search, keywords are automatically extracted from information units in accordance with a keyword dictionary. Each of the information units is made by converting an individual document into the corresponding electronic form. The keyword dictionary comprises a set of keywords which is to be used for search. Then, an inverted file is automatically produced comprising the thus extracted keywords and record numbers. Each of the record numbers indicates a position, on an information storing medium, at which position an information unit is stored., the information unit corresponding to the extracted keyword. Then, at the time of retrieval, a keyword is specified by a user and then the retrieval system searches the keywords in the inverted file for the specified keyword.

Other terms such as "index file" may be used instead of "inverted file". In such a keyword search, it is not possible to retrieve an information unit using a keyword which is not included in the keyword dictionary (free keyword). Further, it is necessary to regenerate the inverted file(s) if the information unit and/or the keyword dictionary is revised.

The technology and form of above-mentioned full-text search may differ slightly when applied to different information processing systems. In order to implement the full-text search, a retrieval file is produced by compressing the information units, for example. Even during this, compressing, almost all of the original contents of the information units are maintained. Other terms besides "retrieval file" may be used to denote the same entity in different information retrieval systems.

Advantages obtained from the full-text search will now be described. It solves the following problems occurring in the keyword search: It is not possible to search the entirety of the information units; and it is necessary to regenerate the inverted file if the information units are updated as mentioned above. Further, the above-mentioned full-text search using the retrieval file, solves the problems in a primitive full-text search not using a retrieval file wherein considerable time is required for the primitive full-text search.

SUMMARY OF THE INVENTION

An object of the present invention is to provide an information retrieval system which has flexibility and enables effective information retrieval, in comparison to the above-mentioned information retrieval systems in the related art. In order to achieve the object of the present invention, it is possible to view the information units in an information retrieval system according to the present invention as a part of a hierarchical arrangement. In this hierarchical approach, the personal-information server apparatuses (client apparatuses) are allocated to the lower hierarchy while the general-information server apparatus and the sectional-information server apparatuses (server apparatuses) are allocated to the higher hierarchy. The information retrieval is performed in either a bottom-up manner or a top-down manner based on the hierarchical interpretation. In the bottom-up manner, the search is performed from the lower hierarchy to the higher hierarchy while the search is performed from the higher hierarchy to the lower hierarchy in the top-down manner.

Further, in the information retrieval system according to the present invention, it is also possible to easily change the retrieval direction (between the top-down direction and the bottom-up direction). As a result, flexibility is given to the information retrieval system. Such a function may be implemented by using replaceable information storing media. In contrast to this, in the related art, each of the server apparatuses and/or the client apparatuses employs a disc device, for storing information, such as a hard disc device. Generally speaking, the hard disc device has a property in which the information storing media is not replaceable.

The principle of the information retrieval system according to the present invention will now be described with reference to FIG. 1.

A general-information storing means 1 stores a general information set A which is managed by a general-information managing means 3 which constitutes part a network 2. A plurality of sectional-information storing means $4_1$-$4_M$ store respective sectional information sets $B_1$-$B_M$ which are managed by respective ones of a plurality of sectional-information managing means $5_1$-$5_M$. The plurality of sectional-information managing means constitute part of the above same network. A plurality of personal-information storing means $6_1$-$6_N$ store respective personal information sets $C_1$-$C_N$ which are managed by respective ones of a plurality of personal-information managing means $7_1$-$7_N$. The plurality of personal-information managing means constitute part of the same network. An automatic retrieval means 8 retrieves a predetermined information unit as a result of an automatic search performed on the general information set A, the sectional information sets $B_1$-$B_M$, and the personal information sets $C_1$-$C_N$. Such automatic retrieval is carried out in response to a relevant retrieval command which is input to any of the plurality of personal-information managing means $7_1$-$7_N$. Further, such search and retrieval is made in accordance with hierarchical information D which is used to hierarchically manage, via the network 2, the positions of the information units in the storing means.

The hierarchy information D enables hierarchical interpretation of the places of the information units. As a result, among the entirety of information comprising the general information set A (associated with the highest hierarchy), the sectional information sets $B_1$-$B_M$ (associated with the middle hierarchy), and the personal information sets $C_1$-$C_N$ (associated with the lowest hierarchy), if a predetermined information unit cannot be retrieved in search of the general information set A, for example, it is possible to search another hierarchy's information. Thus, it is possible to search the general information set A, the sectional information sets $B_1$-$B_M$, and the personal information sets $C_1$-$C_N$, in either the top-down manner or the bottom-up manner. In the top-down manner, the search is performed by the general-information managing means 3 first; then by the sectional-information managing means $5_1$-$5_M$ second; and then by the personal-information managing means $7_1$-$7_N$ last. In the bottom-up manner, the search is performed by the personal-information managing means $7_1$-$7_N$ first; then by the sectional-information managing means $5_1$-$5_M$ second; and then by the general-information managing means $7_1$-$7_N$ last.

Other objects and further features of the present invention will become more apparent from the following detailed description when read in conjunction with the accompanying drawings.

BRIEF DESCRIPTION OF THE DRAWINGS

FIG. 39 shows an information retrieval system in a second modified embodiment resulting from modifying the information retrieval system in the second embodiment of the information retrieval system according to the present invention; and FIG. 40 shows an information retrieval system in a third modified embodiment resulting from modifying the information retrieval system in the second embodiment of the information retrieval system according to the present invention;

DESCRIPTION OF THE PREFERRED EMBODIMENTS

Figure 1:
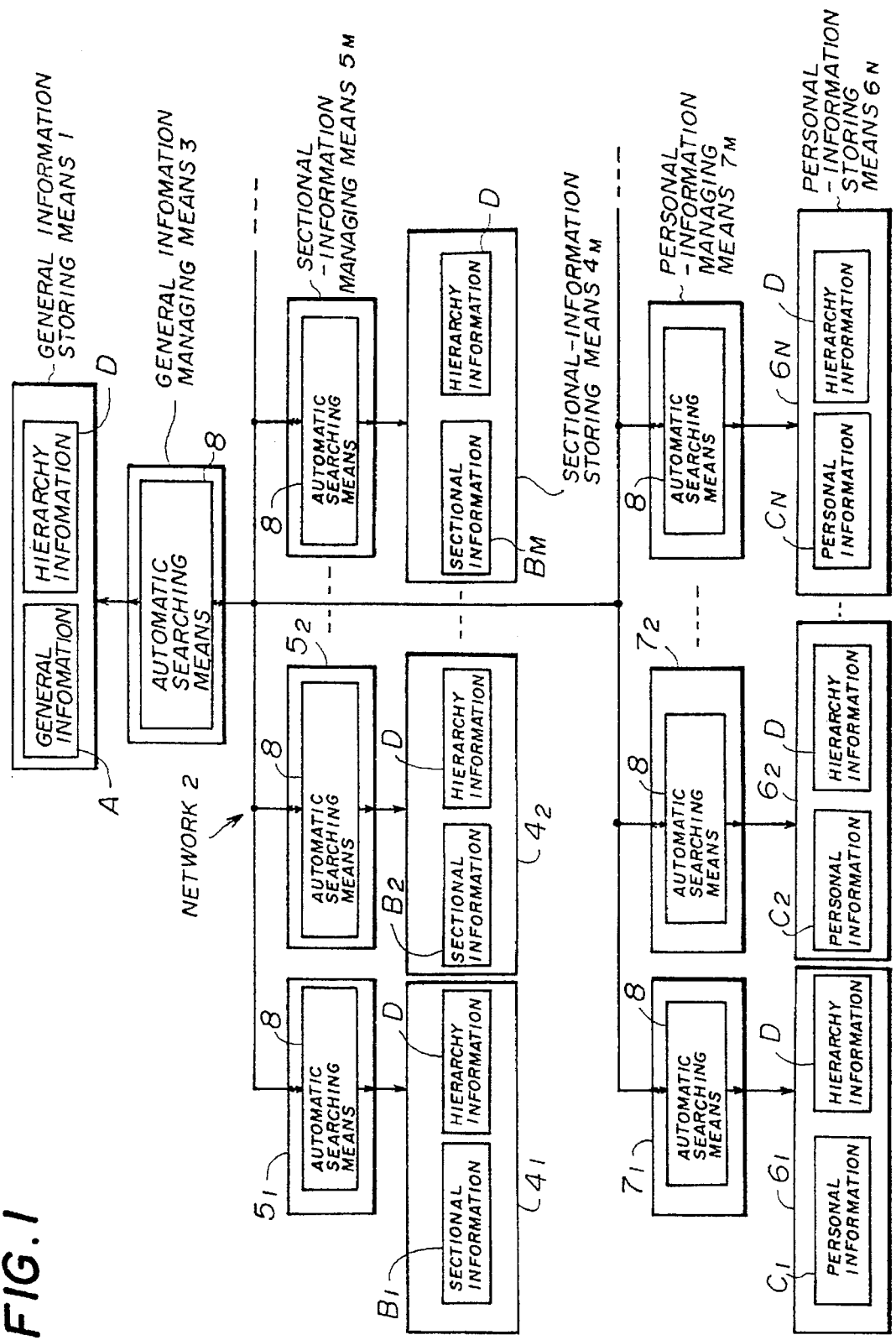
FIG. 1 shows a principle of the information retrieval system according to the present invention.

An information retrieval system in a first embodiment of the information retrieval system according to the present invention will now be described with reference to FIG. 1.

Figure 2:
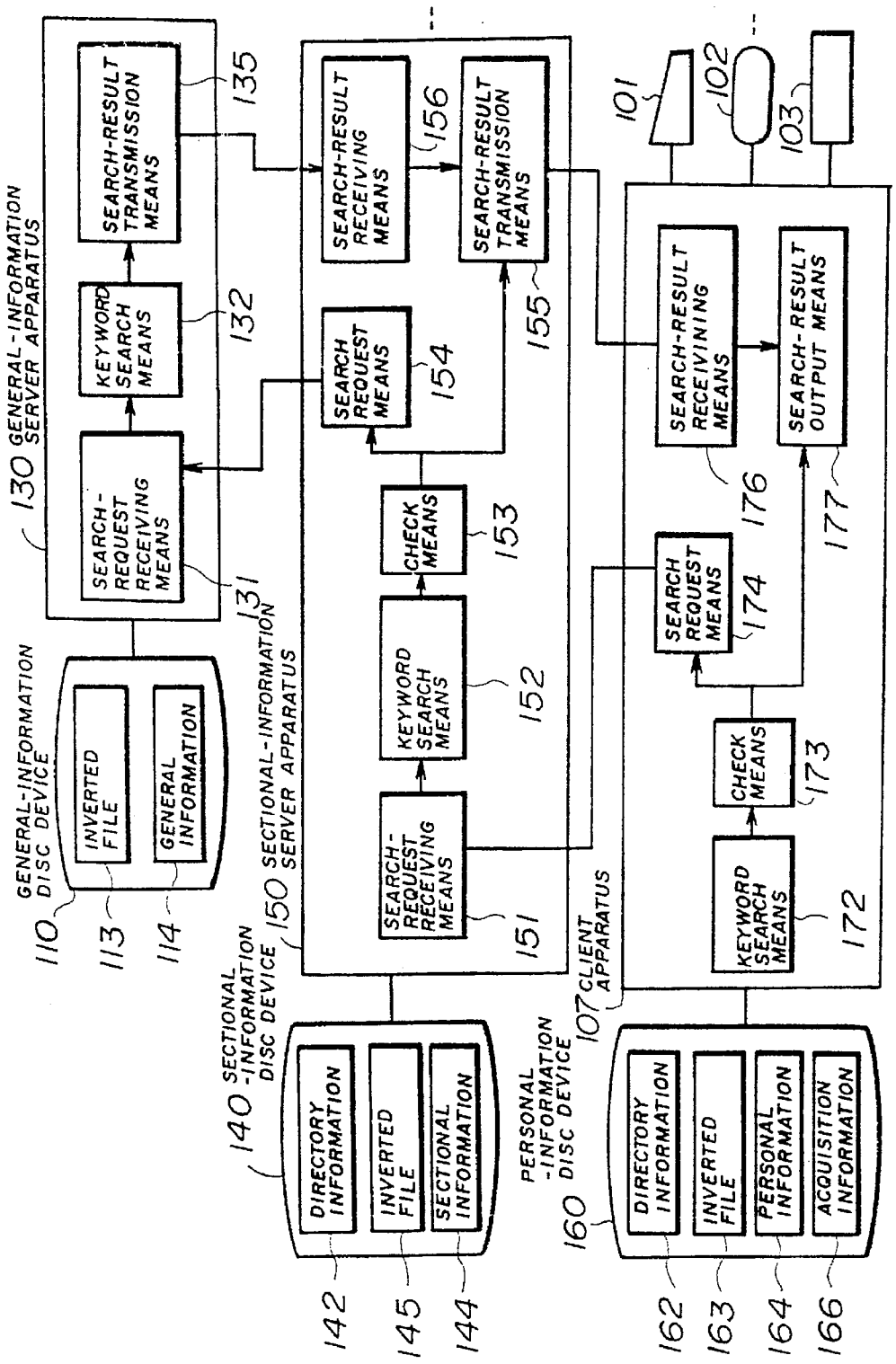
FIG. 2 shows a block diagram of an information retrieval system in a first embodiment of the information retrieval system according to the present invention.

In FIG. 2, a high-hierarchy general-information server apparatus 130, a plurality of middle-hierarchy sectional-information server apparatuses 150 and a plurality of low-hierarchy client apparatuses 170 are hierarchically interlinked via a LAN provided in a large firm, for example. (In FIG. 2, indication of the linkage comprising the connection with other sectional-information apparatus(es) 150 and the connection with other client apparatus(es) 170 is omitted for the sake of simplicity.) The number of general-information server apparatuses 130 is not limited to one as shown in FIG. 2 and a plurality of general-information server apparatuses 130 may be provided there.

The general-information server apparatus 130 is disposed in the headquarters, for example, of the firm and has a general-information disc device 110 acting as storing means. Each of the sectional-information server apparatuses 150 is disposed in a respective section such as a supervisory section in the firm and has a sectional-information disc device 140 acting as storing means.

Each of the server apparatuses 130 and 150 comprises a central processing unit (CPU, hereinafter), a memory and software program. That is, the general-information server apparatus 130 comprises search-request receiving means 131, keyword search means 132 and search-result transmission means 135.

Each of the sectional-information server apparatuses 150 comprises search-request receiving means 151, keyword search means 152, check means 153, search request means 154, search-result transmission means 155 and search-result receiving means 156.

Each of the client apparatuses 170 is disposed in a respective business office and has a personal-information disc device 160 acting as storing means. Each of the client apparatuses 170 comprises a CPU, a memory, and a software program. That is, each of the client apparatuses 170 comprises keyword search means 172, check means 173, search request means 174, and search-result output means 177.

Each of the client apparatuses 170 comprises a personal computer or a workstation, for example. Further, the user of each of the client apparatuses 170 comprises a respective employee of a respective business office of the firm, for example.

The user may search the general information 114, sectional information 144 and personal information 164 in a bottom-up manner. This information to be searched is which is stored in a relevant disc device of the disc devices 110, 140 and 160. This search is implemented so that relevant information is displayed on display means 102 such as a cathode ray tube (CRT, hereinafter). Such a search is carried out in accordance with specifications made by the user through input device 101 such as a keyboard connected to the client apparatus 170.

As a result of the search, some information may be retrieved and a desired item of information among the retrieved information may be stored, as an acquisition information 166, by means of the personal-information disc device 16.0 if necessary and/or may be output by means of a printing device 103 such as a laser printer if necessary.

Each of the disc devices 110, 140 and 160 comprises a hard disc device having a large storage capacity. The general-information disc device 110 stores inverted file 113 and the general information 114. The general information 114 comprises general information concerning the firm and is managed by the general-information server apparatus 130. The inverted file comprises information which is to be used for information retrieval and is automatically produced from the general information.

Each of the sectional-information disc devices 140 stores directory information 142, inverted information 143 and the sectional information 144. The sectional information comprises information commonly used in the supervisory section for example, and is managed by the relevant sectional-information server apparatus 150. The inverted file 144 comprises information which is automatically produced from the sectional information 144 and is to be used for information retrieval.

The sectional information 144 is produced so that a partial set of the general information 114 (that is, part of the general information) is used as master information (that is, information to be used as the base which may by modified as mentioned below) of the sectional information 144. Then, the sectional information 144 may be modified as is appropriate during use in a respective section so that new information may be added and/or unnecessary information may be removed. Thus, the resulting sectional information comprises information not always identical to the above master information, that is, the partial section of the general information. Further, there may be various kinds of sectional information 144, each belonging to a respective one of the plurality of sectional-information server apparatuses 150. Each kind of sectional information 144 is used in a respective different supervisory section so that these kinds of the sectional information 144 are different from one another and different from the above master information, comprising the partial set of the general information 114.

Each of the personal-information disc devices stores directory information 162, inverted information 163 and the personal information 164. The personal information 164 in each device is used by a respective employee-individual belonging to a respective business office and is managed by the respective one of the client apparatuses 170.

The personal information 164 is produced, similarly to the production of the sectional information 144, in the respective business office so that a partial set of the general information 144 is used as master information of the personal information 164. Alternatively, it may be that the personal information 164 is produced so that a partial set of sectional information 144 is used as master information of the personal information 164. Acquisition information 166 obtained as a result of information retrieval is added to the personal information 164. The inverted file 163 comprises information which is automatically produced from the personal information 164 and is to be used for information retrieval.

The directory information 142 and 162 comprises hierarchy information, such as mentioned above, which is used for hierarchically managing the positions of the various information units through the LAN. In the information retrieval system in the first embodiment shown in FIG. 2, each of the personal-information disc devices and sectional-information disc devices 140 stores a respective one of the directory information sets 162 and 142. Such a storage-information arrangement is made in order to implement the search operation in a bottom-up manner starting from the lower hierarchy-information to the higher hierarchy-information.

By using the directory information 162 and 142, the search operation is automatically carried out as follows: A user inputs a retrieval command to the relevant client apparatus 170 through the input device 101. Then, the search is carried out on the personal information 164 in accordance with the input retrieval command. Then, if necessary, the search is performed on the relevant sectional information 144 subsequent to the search performed on the relevant personal information 164. The search continuation from the search on the personal information 164 to the search on the sectional information 144 is controlled in accordance with the relevant directory information 162. Further, then, if necessary, the search is performed on the general information 114 subsequent to the search performed on the above sectional information 144. The search continuation from the search on the sectional information 144 to the search on the general information 114 is controlled in accordance with the relevant directory information 142.

Thus, the predetermined information may be retrieved (acquisition information 166) as a result of a search on the information 164, 144 and 114 sequentially in the bottom-up manner. In this construction, it is not necessary for the general-information disc device 110 to store directory information. Such a bottom-up search method is effective particularly in a case where information belonging to each hierarchy is related such that information belonging to one hierarchy is a partial set of information belonging to another hierarchy.

An operation flow of the information retrieval system in the first embodiment of the present invention will now be described with reference to FIGS. 2–15.

After the particular client apparatus 170 receives a retrieval command from a user as the user inputs a certain keyword thereto, the keyword search means 172 carries out keyword search processing, in a step S30 (the term 'step' will be omitted, hereinafter) of FIG. 3.

Figure 3:
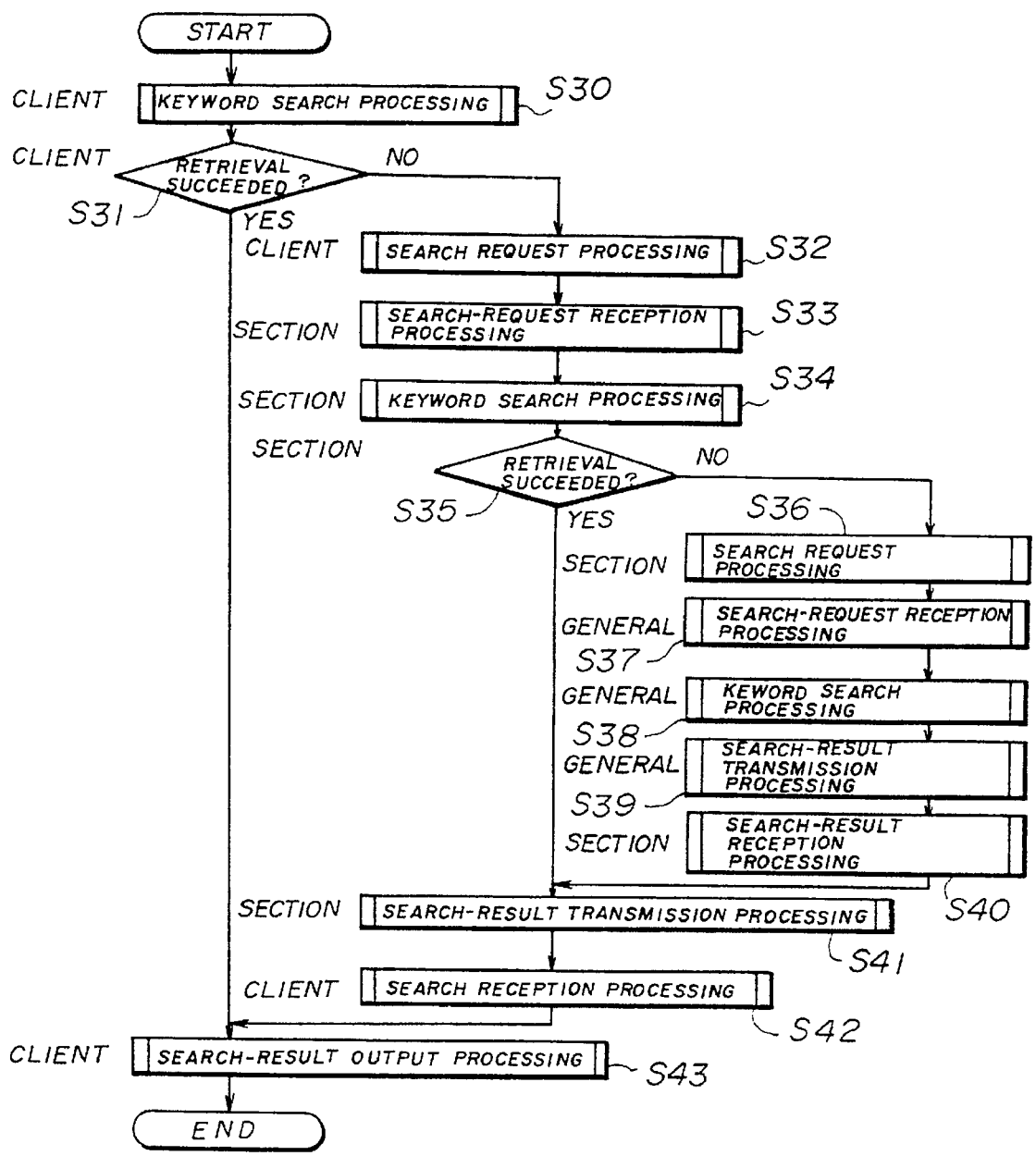
FIG. 3 shows an operation flow associated with a main routine in the system shown in FIG. 2.
Figure 4:
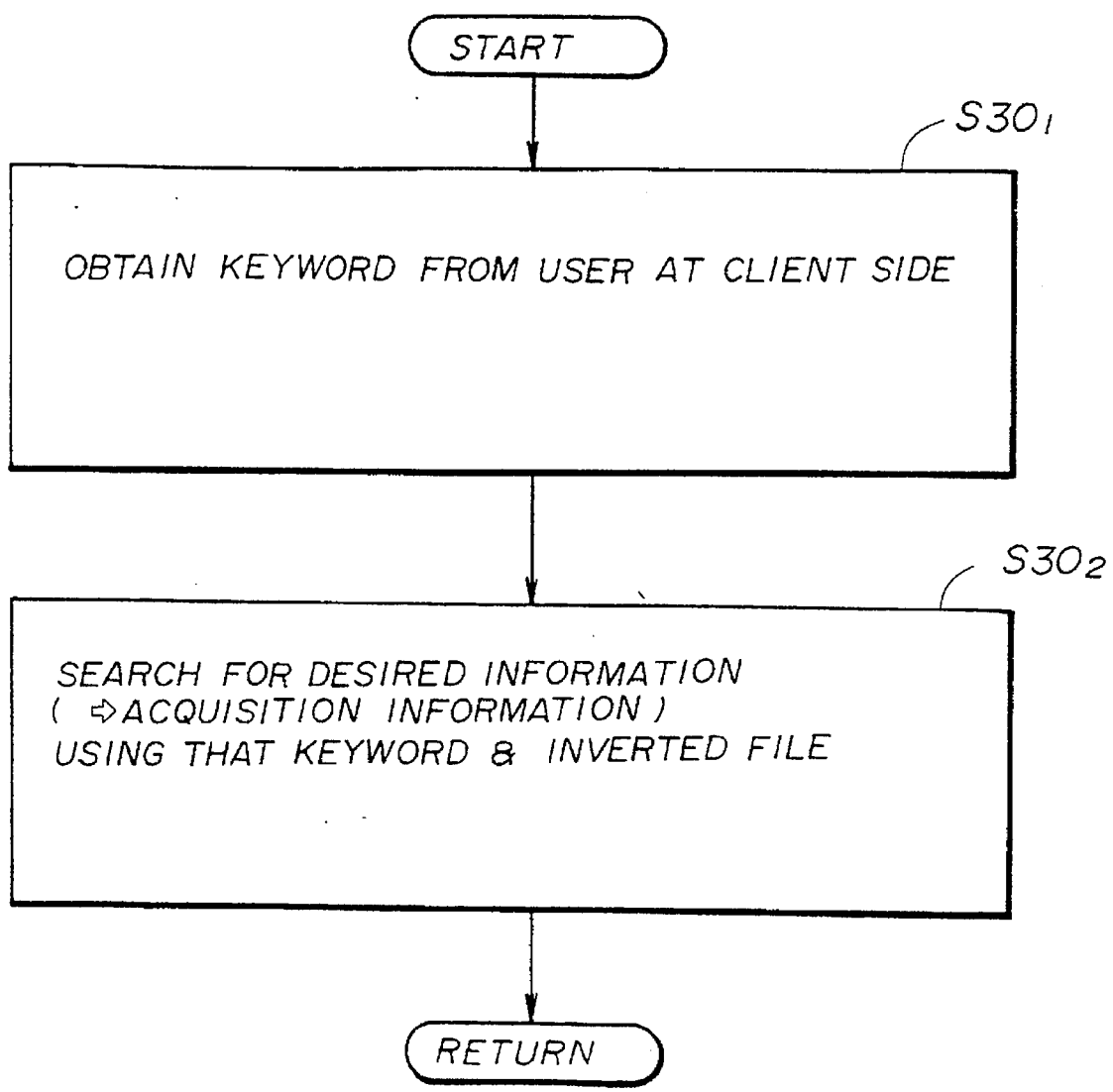
FIG. 4 shows a detailed operation flow of keyword search processing (step S30) in the operation flow of FIG. 3.

That is, as shown in FIG. 4, the keyword search means 172 receives, at the client apparatus 170, the above keyword from the user in $S30_1$. Then, the means 172 searches, for the desired information, the personal information 164 belonging to the relevant client apparatus 170 in $S30_2$. This search is made using the relevant keyword and the inverted file 163 belonging to the relevant client apparatus 170. Then, execution returns to the main routine of FIG. 3.

After the keyword search processing of S30, the check means 173 carries out determination processing S31 so that it is determined whether or not the information desired by the user has been retrieved. If it has been retrieved (YES) then the search-result output means 177 carries out the below described search-result output processing S43. Then, the retrieved acquisition information 166 is stored by means of the personal-information disc device 160 belonging to the relevant client apparatus 170.

If the desired information could not be retrieved (NO) as a result of the determination in S31, the search request means 174 carries out a search request processing S32.

Figure 5:
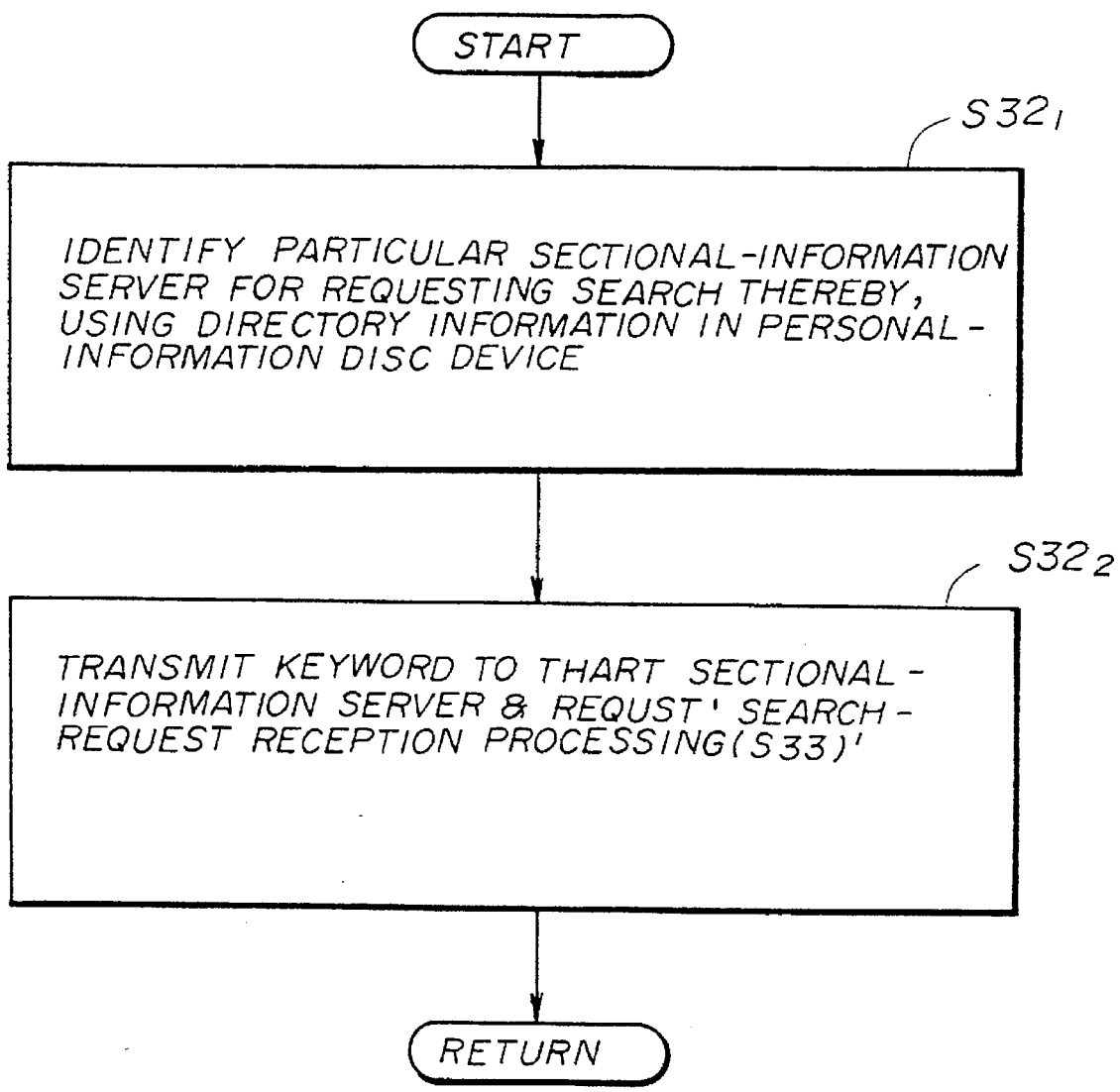
FIG. 5 shows a detailed operation flow of search request processing (step S32) in the operation flow of FIG. 3.

That is, as shown in FIG. 5, in $S32_1$, the search request means 174 uses the directory information 162 stored in the personal-information disc device 160 associated with the relevant client apparatus 170. Thus, the means 174 identifies a particular sectional-information server apparatus 150 from among the plurality of inter-linked sectional-information server apparatuses 150. Each of the plurality of sectional-information server apparatuses 150 belongs to a respective one of supervisory sections and is in the middle hierarchy. The identified particular apparatus 150 is one which the search request means 174 is to request to search for the above desired information.

Then, in $S32_2$, the search request means 174 transmits the above keyword to the above identified sectional-information server apparatus 150 and then requests search-request reception processing S33. Then, execution returns to the main routine of FIG. 3.

Figure 6:
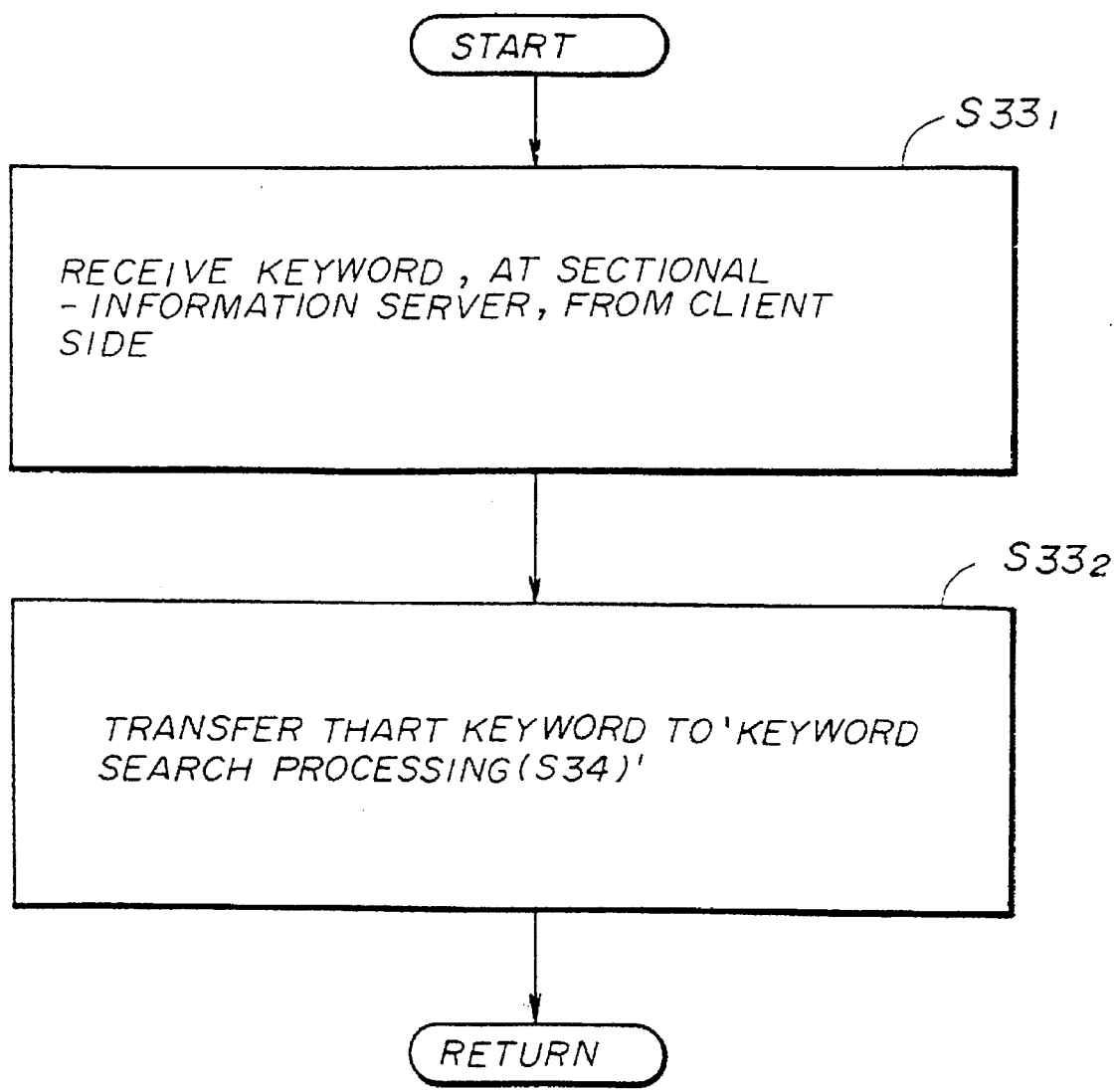
FIG. 6 shows a detailed operation flow of search request reception processing (step S33) in the operation flow of FIG. 3.

The search-request reception means 151 in the above identified sectional-information server apparatus 150 carries out the above search-request reception processing S33 as shown in FIG. 6.

That is, in $S33_1$, the search-request reception means 151 receives the above keyword from the above client apparatus 170. Then, in $S33_2$, the received keyword is transferred to keyword search processing S34 of the main routine so that execution returns to the main routine of FIG. 3.

Figure 7:
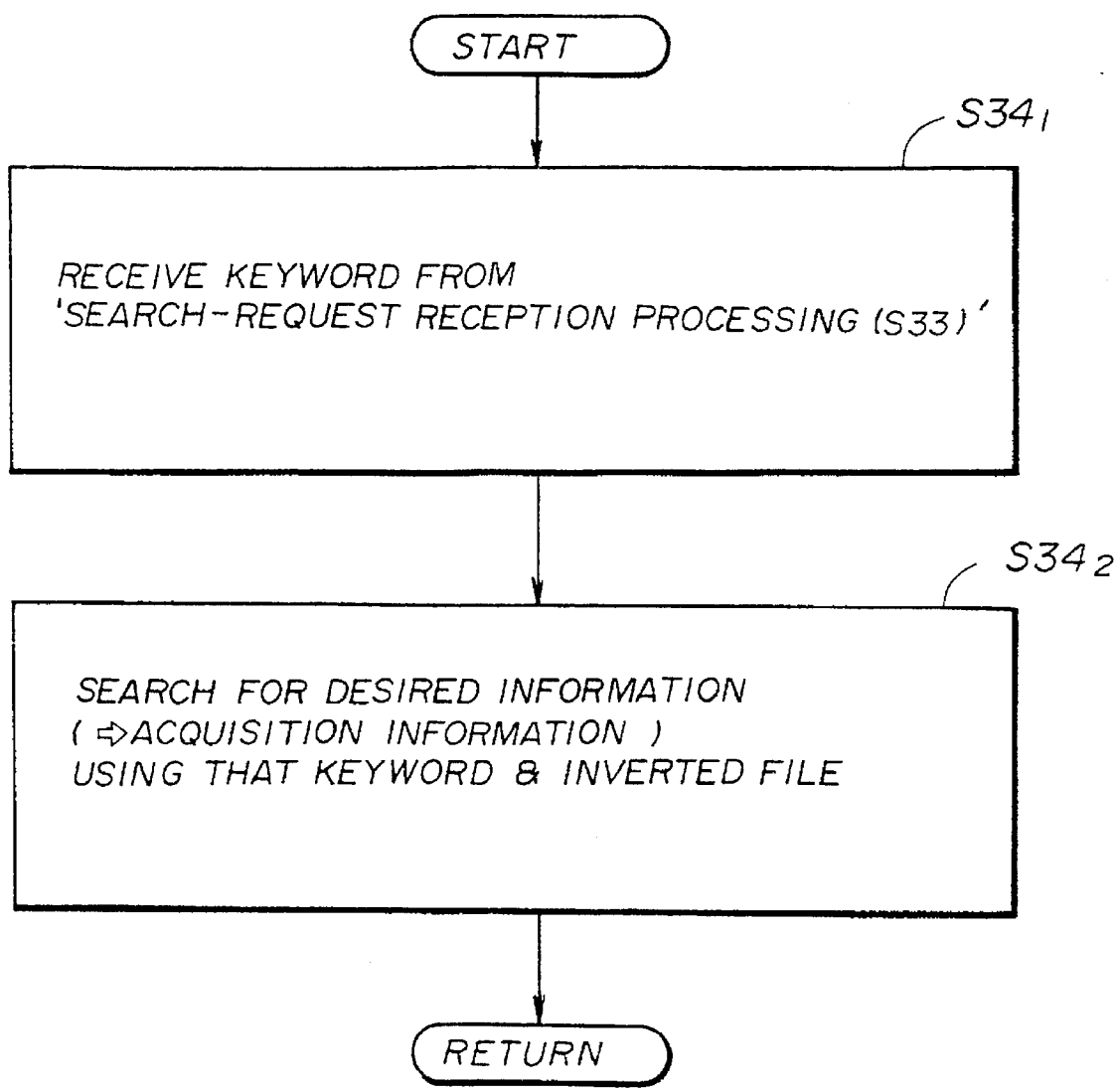
FIG. 7 shows a detailed operation flow of keyword search processing (step S34) in the operation flow of FIG. 3.

The keyword search means 152 carries out the keyword search processing S34 as shown in FIG. 7.

That is, in $S34_1$, the keyword search means 152 receives the above keyword from the search-request reception processing S33 carried out by the search-request reception means 151. Then, in $S34_2$, the keyword search means 152 uses the received keyword and the relevant inverted file 143 so as to search the relevant sectional information 144. Then, execution returns to the main routine of FIG. 3.

Subsequent to the above keyword search processing S34, the check means 153 carries out determination processing S35. As a result, if it determines that the above user-desired information has been retrieved (YES), then the relevant search-result transmission means 155, search-result receiving means 176 and search-result output means 177 carry out the below-described processing S41–S43. Thus, the retrieved acquisition information 166 is stored by means of the relevant personal-information disc device 160.

If the desired information could not be retrieved (NO) as determined in the determination S35, the search request means 154 carries out search request processing S36.

Figure 8:
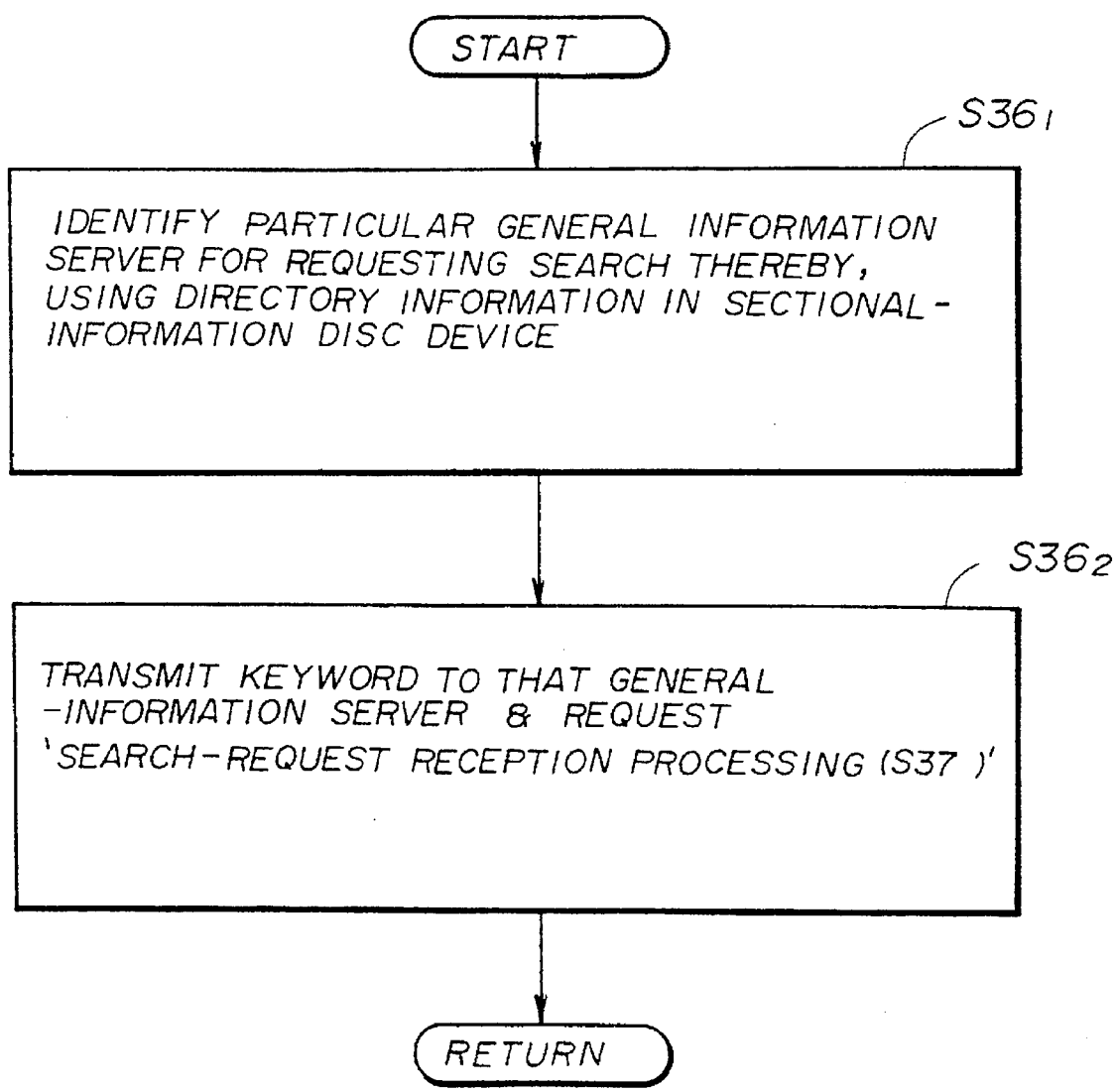
FIG. 8 shows a detailed operation flow of search request processing (step S36) in the operation flow of FIG. 3.

That is, as shown in FIG. 8, in S36$_1$, the search request means 154 uses the directory information 142 stored in the relevant sectional-information disc device 140. Thus, the means 154 identifies the highest-hierarchy headquarter general-information server apparatus 130 (from among a plurality of general-information server apparatuses 130, if there are a plurality of inter-linked general-information server apparatuses 130). The identified general-information server apparatus 130 is that which the search request means 154 is to request to perform the relevant search.

Subsequently, in S36$_2$, the search request means 154 transmits the above keyword to the thus identified general-information server apparatus 130. Then, the means 154 requests search-request reception processing S37 in the main routine so that execution returns to the main routine of FIG. 3.

Figure 9:
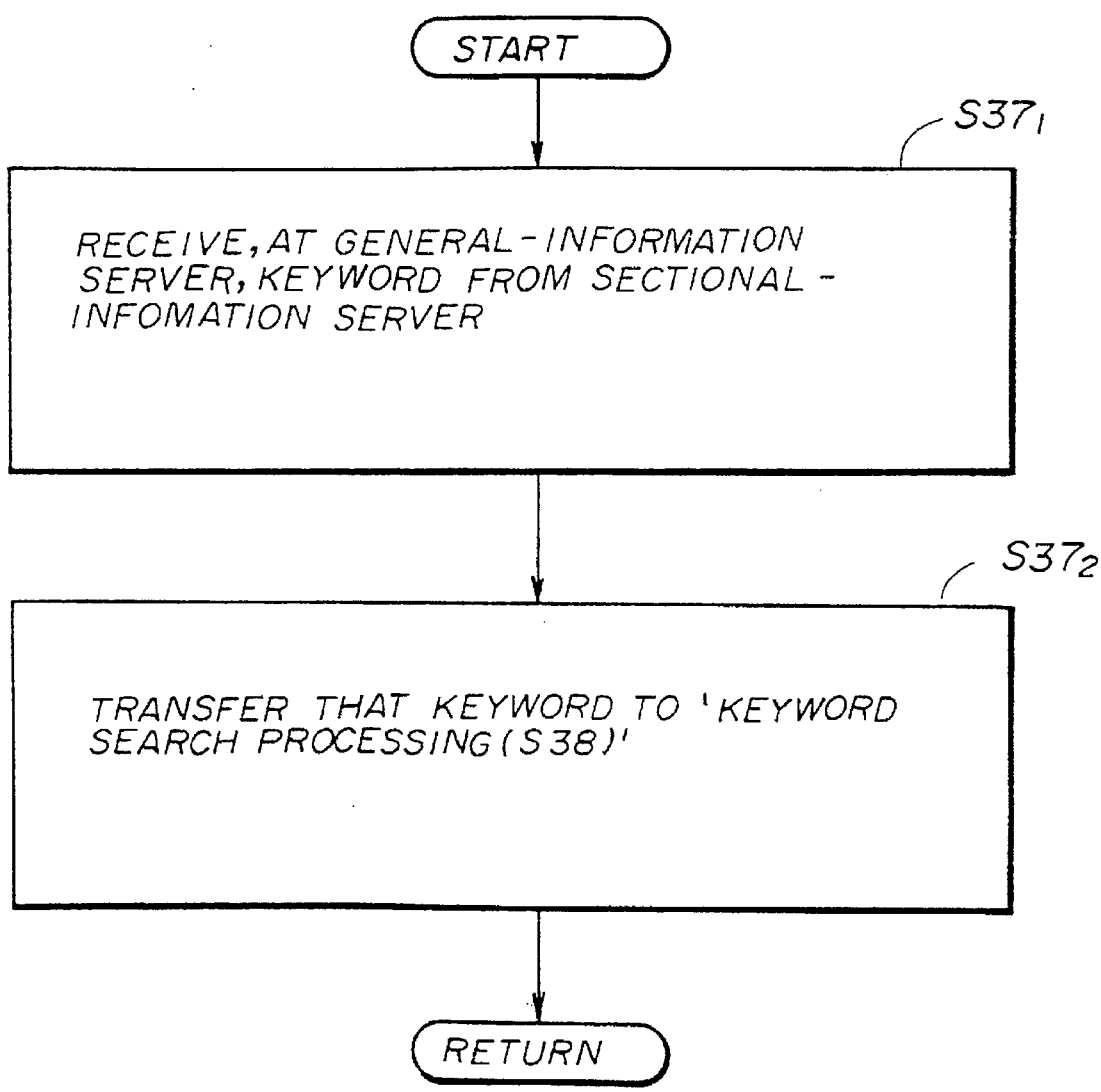
FIG. 9 shows a detailed operation flow of search request reception processing (step S37) in the operation flow of FIG. 3.

The search-request receiving means 131 of the relevant general-information server apparatus 130 carries out the above search-request reception processing S37 as shown in FIG. 9.

That is, in S37$_1$, the above search-request receiving means 131 receives the above keyword from the relevant sectional-information server apparatus 150. Then, in S37$_2$, the means 131 transfers the received keyword to keyword search processing S38 in the main routine so that execution returns to the main routine of FIG. 3.

Figure 10:
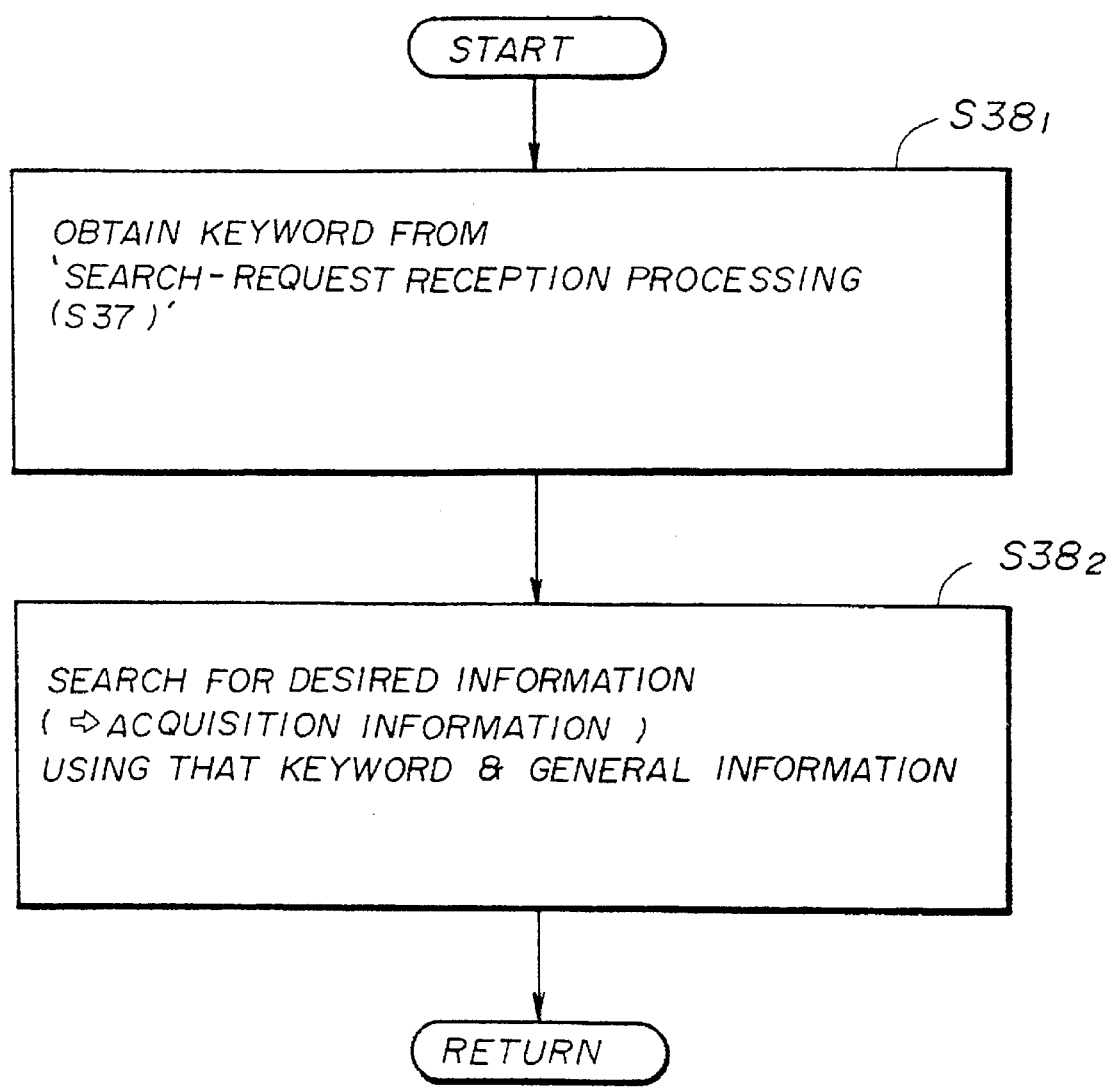
FIG. 10 shows a detailed operation flow of keyword search processing (step S38) in the operation flow of FIG. 3.

The relevant keyword search means 132 carries out the above keyword search processing S38 as shown in FIG. 10.

That is, in S38$_1$, the keyword search means 132 receives the relevant keyword from the above search-request reception processing S37 performed by the search-request receiving means 131. Then, in S38$_2$, the means 132 uses the received keyword and the relevant inverted file 113 to search the (relevant) general information 114 for the relevant desired information.

After the desired information has been retrieved from the general information 114, respective processing S39–S43 are sequentially carried out so that the retrieved information is stored as the relevant acquisition information 166 in the relevant personal-information disc device 16.0.

Figure 11:
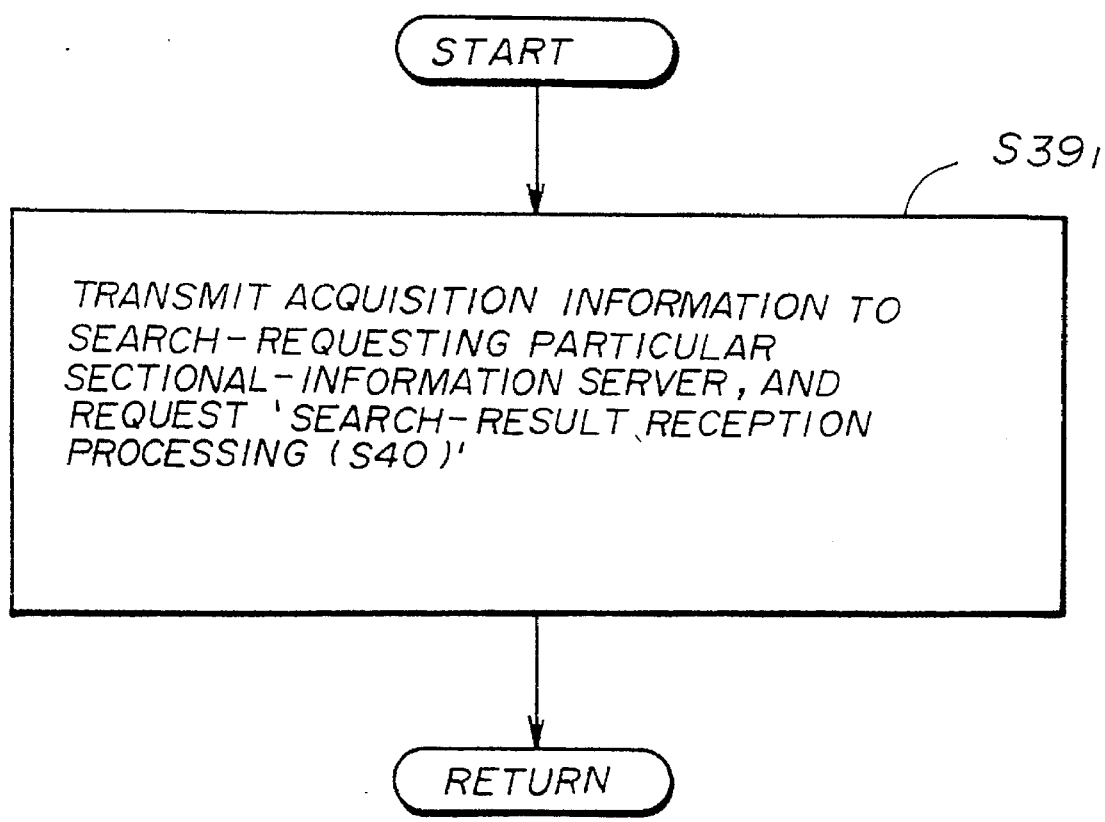
FIG. 11 shows a detailed operation flow of search result transmission processing (step S39) in the operation flow of FIG. 3.

That is, the search-result transmission means 135 carries out search-result transmission processing S39 as shown in FIG. 11.

That is, in S39$_1$, the search-result transmission means 135 transmits the above relevant acquisition information to the particular sectional-information server apparatus 150, which has previously requested the relevant retrieval. Then, the means 135 requests search-result reception processing S40 in the main routine so that execution returns to the main routine of FIG. 3.

Figure 12:
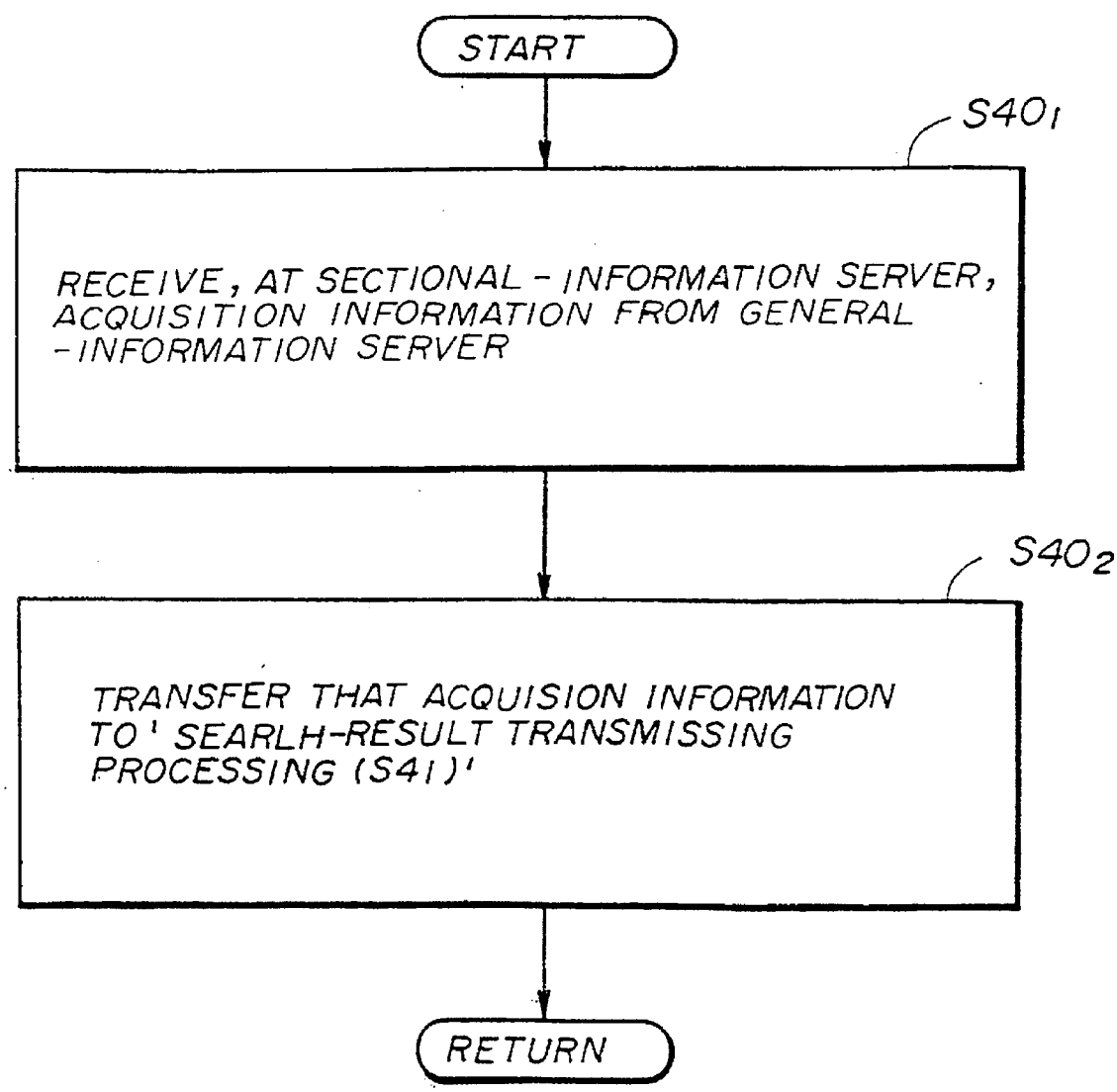
FIG. 12 shows a detailed operation flow of search result reception processing (step S40) in the operation flow of FIG. 3.

Then, the search-result receiving means 156 of the relevant sectional-information server apparatus 150 carries out the above search-result reception processing S40 as shown in FIG. 12.

That is, in S40$_1$, the search-result receiving means 156 receives the above acquisition information from the general-information server apparatus 130. Then, the means 156, in S40$_2$, transfers the received acquisition information to search-result transmission processing S41 in the main routine so that execution returns to the main routine of FIG. 3.

Figure 13:
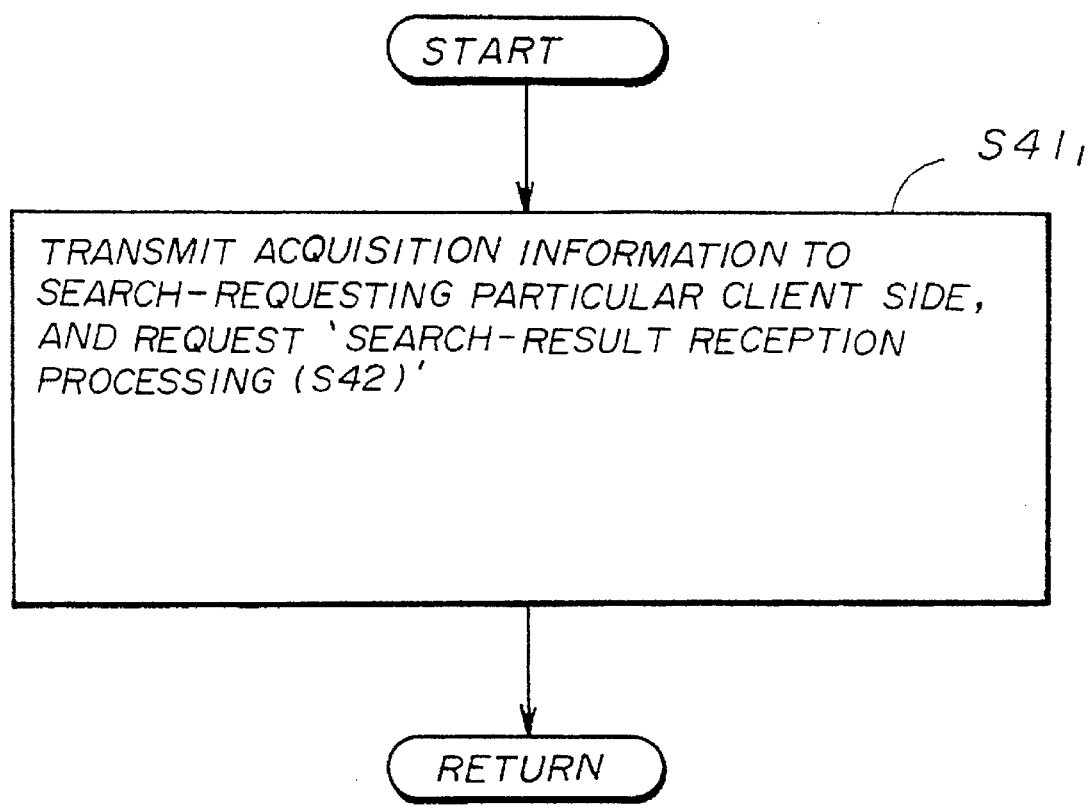
FIG. 13 shows a detailed operation flow of search result transmission processing (step S41) in the operation flow of FIG. 3.

The relevant search-result transmission means 155 carries out the above search-result transmission processing S41 as shown in FIG. 13.

That is, in S41$_1$, the search-result transmission means 155 transmits the above acquisition information to the particular client apparatus 170 which has previously requested the relevant retrieval. Then, the means 155 requests search-result reception processing S42 in the main routine so that execution returns to the main routine of FIG. 3.

Figure 14:
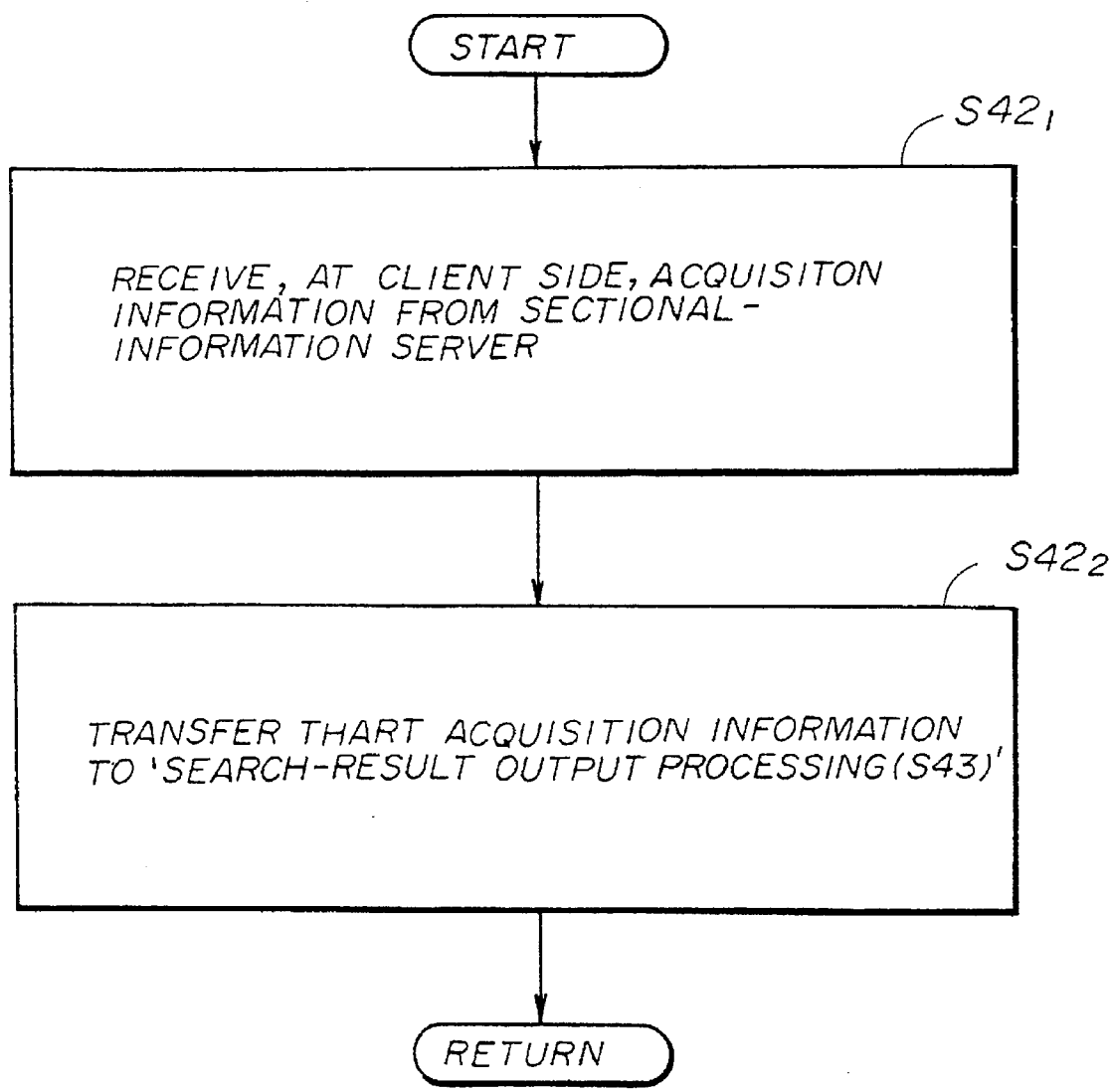
FIG. 14 shows a detailed operation flow of search result reception processing (step S42) in the operation flow of FIG. 3.

The search-result receiving means 176 of the above particular client apparatus 170 carries out the above search-result reception processing S42 as shown in FIG. 14.

That is, in S42$_1$, the search-result receiving means 176 receives the above relevant acquisition information from the above sectional-information server apparatus 150. Then, in S42$_2$, the means 176 transfers the received acquisition information to search-result output processing S42 in the main routine so that execution returns to the main routine of FIG. 3.

Figure 15:
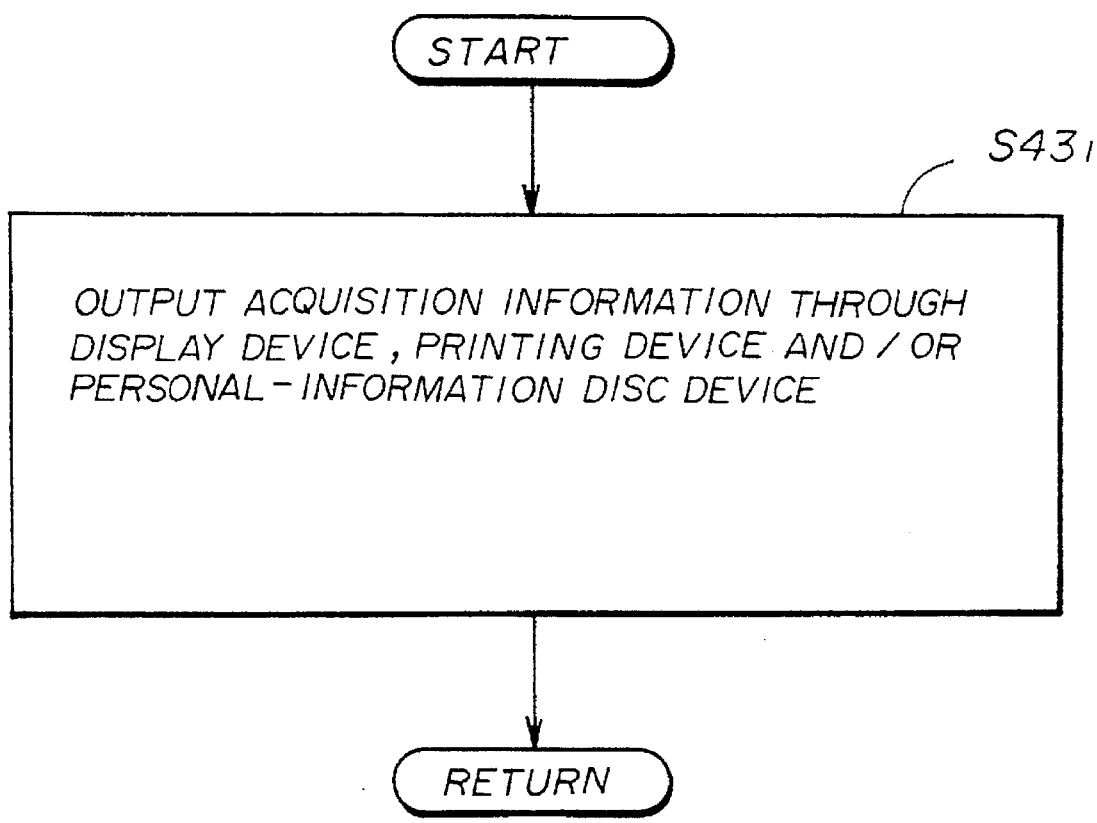
FIG. 15 shows a detailed operation flow of search result output processing (step S43) in the operation flow of FIG. 3.

The search-result output means 177 of the above client apparatus 170, carries out the above search-result output processing S43, the last of the main routine of FIG. 3, as shown in FIG. 15.

That is, in S43$_1$, the search-result output means 177 displays the above relevant acquisition information on the relevant display device 102, and makes the relevant personal-information disc device 160 store it, if necessary. Further, if necessary, this acquisition information is printed out through the relevant printing device 103. Then, execution returns to the main routine of FIG. 3 and then the relevant search/retrieval processing has been completed.

Thus, in the information retrieval system in the first embodiment of the present invention, the higher-hierarchy-associated information is automatically searched using the relevant directory information if a desired item of information could not be retrieved (cannot be found) as a result of a search performed on a lower hierarchy-associated information. Thus, the search may be performed automatically in a bottom-up manner starting from a relevant client apparatus 170 to the general-information server apparatus 130, so that the desired item of information may be retrieved. Consequently, it is possible to realize an information retrieval operation which is efficient and has flexibility.

An information retrieval system in a first modified example of the above first embodiment of the present invention will now be described with reference to FIG. 16. In the system shown in FIG. 16, a full-text search is carried out in a bottom-up manner as compared to the keyword search carried out in a bottom-up manner in the system shown in FIG. 2 as described above.

That is, a general-information server apparatus 130a has full-text search means 132a instead of the keyword search means 132 provided in the general-information server apparatus 130. Similarly, a sectional-information server apparatus 150a has full-text search means 152a instead of the keyword search means 152 provided in the sectional-information server apparatus 150. Further, a client apparatus 170a has full-text search means 172a instead of the keyword search means 172 provided in the client apparatus 170.

Then, according to the above-described construction, the full-text search is carried out in bottom-up manner using the following processing: In the processing, the keyword search processing in each of S30, S34 and S38 in the operation flow shown in FIG. 3 is replaced by the full-text search processing.

Figure 16:
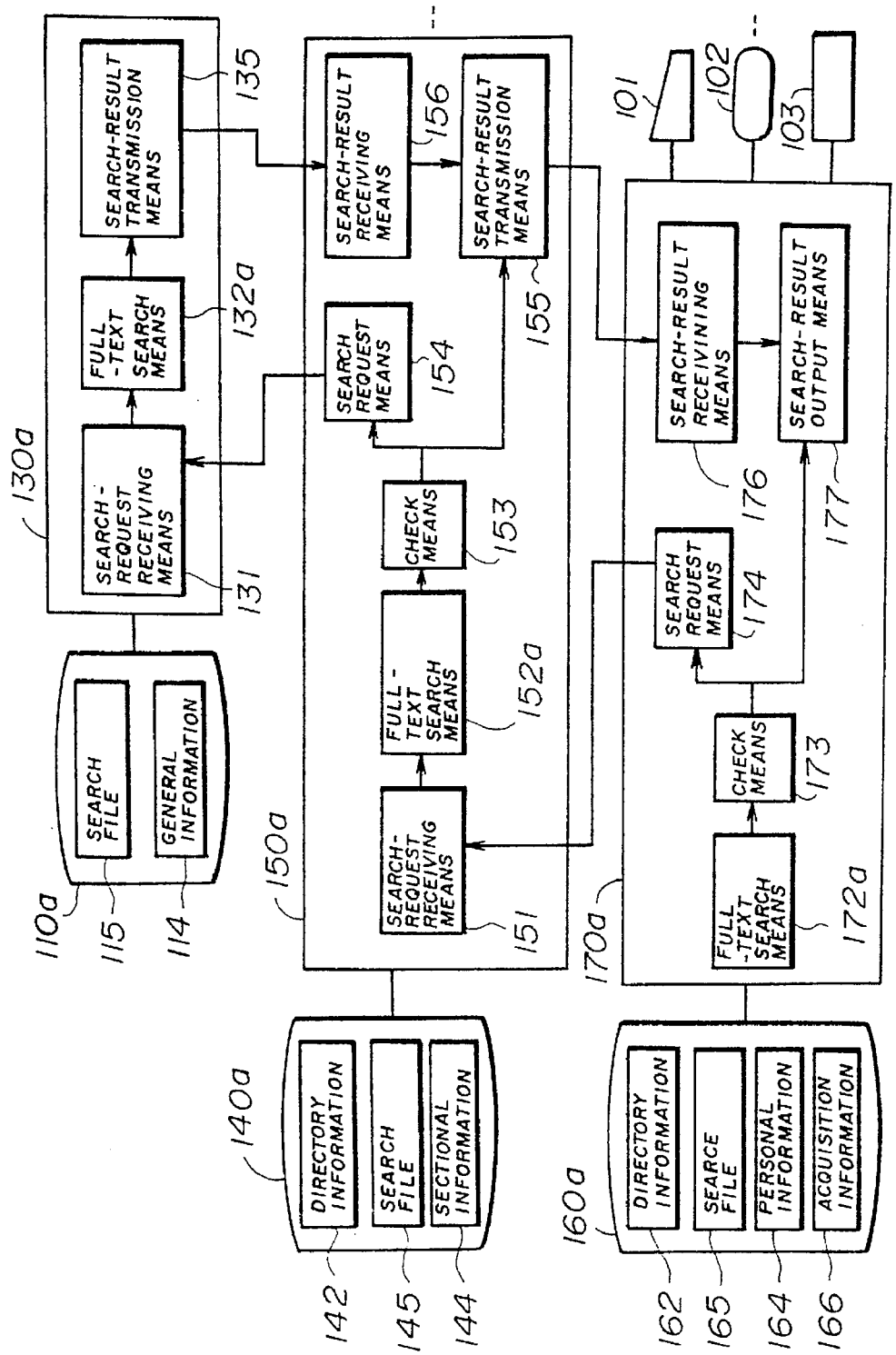
FIG. 16 shows an information retrieval system in a first modified embodiment resulting from modifying the information retrieval system in the first embodiment of the information retrieval system according to the present invention.

Further, as shown in FIG. 16, a search file 115, instead of the inverted file 113 shown in FIG. 2, is stored by means of the general-information disc device 110a. A search file 145, instead of the inverted file 143 shown in FIG. 2, is stored by means of the sectional-information disc device 140a. A search file 165, instead of the inverted file 163 shown in FIG. 2, is stored by means of the personal-information disc device 160a.

The search file 115 is one automatically produced from the general information 114 by compression thereof so that almost all of the contents of the general information 114 are maintained during the compression. The search files 145 and 165 are similarly produced from the sectional information 144 so that almost all of the contents of the sectional information 144 and personal information 164 respectively.

As described above, the full-text search may be implemented using the respective search files 165, 145 and 115.

An information retrieval system in a second modified example of the above first embodiment of the present invention will now be described with reference to FIG. 17.

Figure 17:
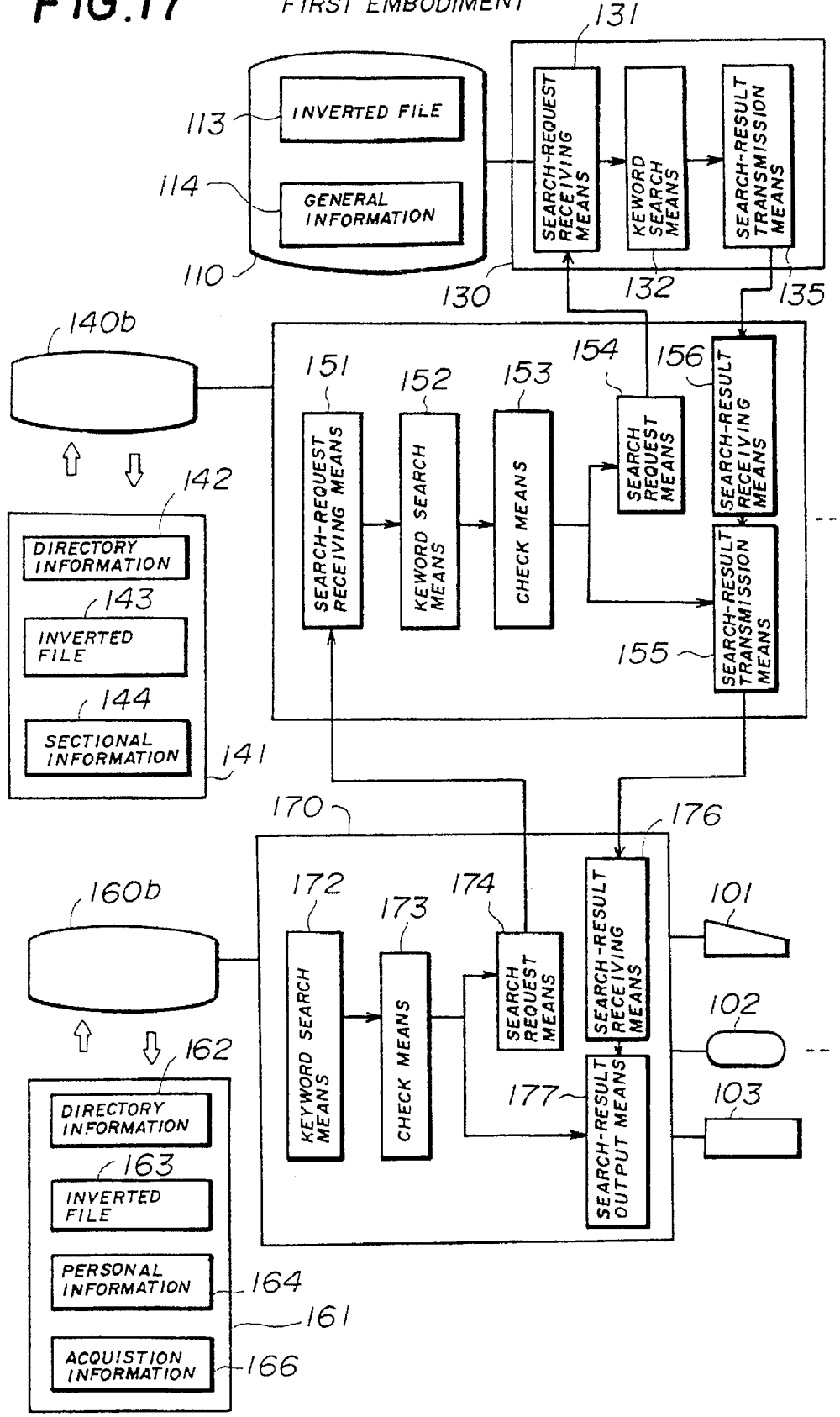
FIG. 17 shows an information retrieval system in a second modified embodiment resulting from modifying the information retrieval system in the first embodiment of the information retrieval system according to the present invention.

In the system of FIG. 17, a magneto-optical disc device 140b is employed instead of the sectional-information disc device 140 comprising a hard disc shown in FIG. 2. Similarly, an magneto-optical disc device 160b is employed instead of the personal-information disc device 16.0 comprising a hard disc.

As a result of the above-described modification, the following operation manner may be implemented: A magneto-optical (information storage) disc 141 is provided in which the directory information 142, inverted file 143 and sectional information 144 is stored. Then, the above magneto-optical disc 141 is loaded into the magneto-optical disc device 140b. The magneto-optical disc 141 in the disc device 140b may be replaced by another magneto-optical disc in which other information is stored. As a result of such a replacement, additional sectional information may be used if appropriate, thus increasing the amount of sectional information available.

Further, it is also possible to switch the search direction between the above-described bottom-up direction and the below-described top-down direction. This switching is implemented by replacing the magneto-optical disc 141 by another magneto-optical disc in which different directory information 142 from that stored in the first magneto-optical disc 141 is stored.

Further, the following operation mode may also be implemented: A magneto-optical disc 161 is provided in which the directory information 162, inverted file 163, personal information 164 and acquisition information 166 is stored. Then, the above magneto-optical disc 161 is loaded into the magneto-optical disc device 160b. The magneto-optical disc 161 in the disc device 160b may also be replaced by another magneto-optical disc in which personal information which different from that stored in the first magneto-optical disc 161 is stored. As a result of such a replacement, the amount of personal information used may be increased if necessary.

In the second modified example, shown in FIG. 17, of the first embodiment of the present invention, the keyword search may be a in bottom-up manner may be carried out in accordance with the operation flow shown in FIG. 3.

An information retrieval system in a third modified example of the above first embodiment of the present invention will now be described with reference to FIG. 18.

Figure 18:
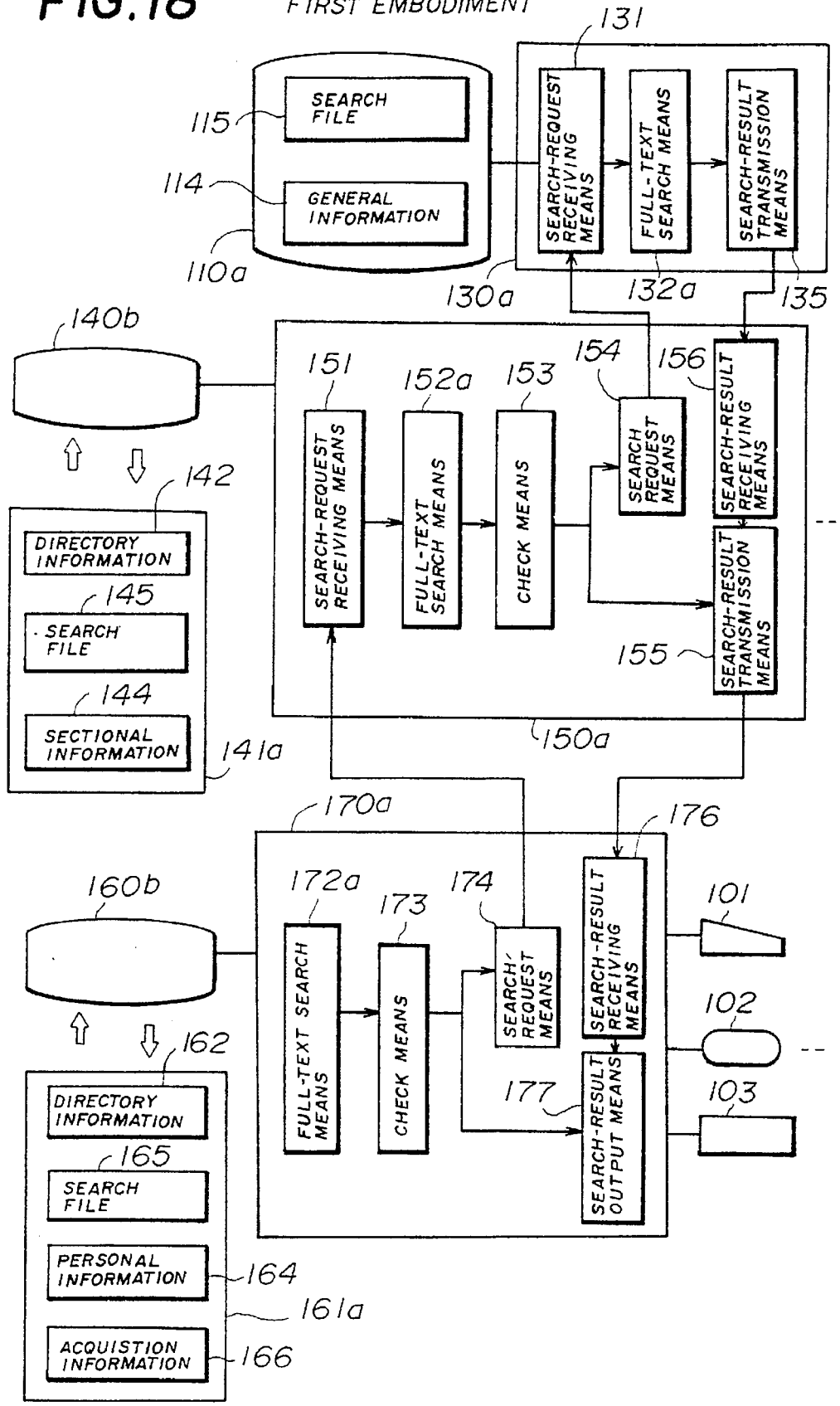
FIG. 18 shows an information retrieval system in a third modified embodiment resulting from modifying the information retrieval system in the first embodiment of the information retrieval system according to the present invention.

In the system of FIG. 18, a magneto-optical disc device 140b is employed instead of the sectional-information disc device 140 comprising a hard disc shown in FIG. 2. Similarly, a magneto-optical disc device 160b is employed instead of the personal-information disc device 16.0 comprising a hard disc.

Further, in the system of FIG. 18, the full-text search is carried out in the bottom-up manner similarly to the operation in the system shown in FIG. 16.

That is, (each of) the general-information server apparatus (es) 130a has a full-text search means 132a, each of the sectional-information server apparatuses 150a has the full-text search means 152a, and each of the client apparatuses 170a has the full-text search means 172a. Then, in this system, the full-text search may be carried out in accordance with an operation flow (not shown in the drawings) similarly to that in the system shown in FIG. 16.

In the above-described construction of the system of FIG. 18, the client apparatus 170a may carry out the full-text search to be performed on the personal information 164 accordingly, using the magneto-optical disc device 160b, and thus using the search file 165 stored in the replaceable magneto-optical disc 161a.

Similarly, the sectional-information server apparatus 150a may carry out the full-text search to be performed on the sectional information 144 accordingly, using the magneto-optical disc device 140b, and thus using the search file 145 stored in the replaceable magneto-optical disc 141a.

In the system of FIG. 18, an advantage similar to that obtained in the system shown in FIG. 17 is obtained as a result of performing the full-text search.

An information retrieval system in a second embodiment of the information retrieval system according to the present invention will now be described with reference to FIG. 19.

Figure 19:
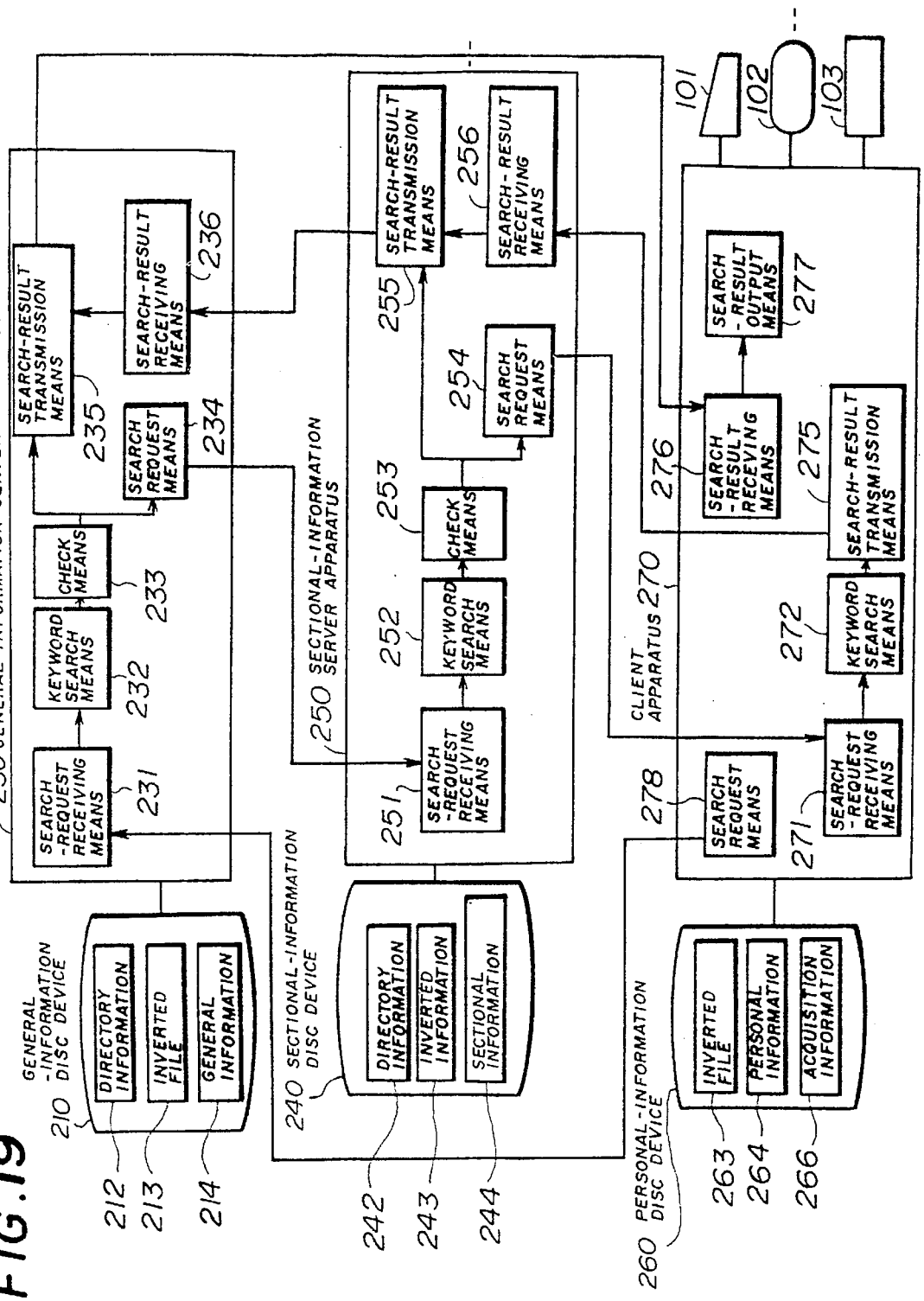
FIG. 19 shows a block diagram of an information retrieval system in a second embodiment of the information retrieval system according to the present invention.

In the system of FIG. 19, a keyword search is carried out in the top-down manner, whereas the keyword search is carried out in a bottom-up manner in the system in the above-described first embodiment shown in FIG. 2.

In FIG. 19, a high-hierarchy general-information server apparatus 230, a plurality of middle-hierarchy sectional-information server apparatuses 250 and a plurality of low-hierarchy client apparatuses 270 are hierarchically inter-linked via a LAN provided in a large firm for example. (In FIG. 19, indication of the linkage comprising the connection with other sectional-information apparatus(es) 250 and the connection with other client apparatus(es) 270 is omitted for the sake of simplicity.) The number of general-information server apparatuses 230 is not limited to one as shown in FIG. 19 and a plurality of general-information server apparatuses 230 may be provided there.

The general-information server apparatus 230 is disposed in the headquarters, for example, of the firm and has a general-information disc device 210 acting as storing means. Each of the sectional-information server apparatuses 250 is disposed in a respective section such as a supervisory section in the firm and has a sectional-information disc device 240 acting as storing means.

Each of the server apparatuses 230 and 250 comprises a CPU, a memory and software program. That is, the general-information server apparatus 230 comprises search-request receiving means 231, keyword search means 232, check means 233, search request means 234, search-result transmission means 235 and search-result receiving means 236.

Each of the sectional-information server apparatuses 250 comprises search-request receiving means 251, keyword search means 252, check means 253, search request means 254, search-result transmission means 255 and search-result receiving means 256.

Each of the client apparatuses 270 is disposed in a respective business office and has a personal-information disc device 260 acting as storing means. Each of the client apparatuses 270 comprises a CPU, a memory, and a software program. That is, each of the client apparatuses 270 comprises search-request receiving means 271, keyword search means 272, search-request transmission means 275, search-result receiving means 276, search-result output means 277 and search-result output means 278.

Each of the client apparatuses 270 comprises a personal computer or a workstation, for example. Further, the user of each of the client apparatuses 270 comprises a respective employee of a respective business office of the firm for example.

The user may search the general information 214, sectional information 244 and personal information 264 in the top-down manner. This information to be searched is one which is stored in a relevant disc device of the disc devices 210, 240 and 260. This search is implemented so that relevant information is displayed on display means 102 such as a cathode ray tube (CRT, hereinafter). Such search is carried out in accordance with specifications made by the user through input device 101 such as a keyboard connected to the client apparatus 270.

As a result of the search, some information may be retrieved and a desired item of information among the retrieved information may be stored, as acquisition information 266, by means of the personal-information disc device 260 if necessary and/or may be output by means of a printing device 103 such as a laser printer if necessary.

Each of the disc devices 210, 240 and 260 comprises a hard disc device having a large storage capacity. The general-information disc device 210 stores directory information 212, inverted file 213 and the general information 294. The reason for the storing of the directory information by means of the general-information disc device 210 of the system of FIG. 19 is that in this system, the relevant search/retrieval is carried out in the top-down manner.

The general information 214 comprises general information concerning the firm and is managed by the general-information server apparatus 230. The inverted file 213 comprises information which is to be used for information retrieval and is automatically produced from the general information.

Each of the sectional-information disc devices 240 stores directory information 242, inverted information 243 and the sectional information 244. The sectional information 244 comprises information commonly used in the supervisory section for example, and is managed by the relevant sectional-information server apparatus 250. The inverted file 244 comprises information which is automatically produced from the sectional information 244 and is to be used for information retrieval.

The sectional information 244 associated with each of the sectional-information disc devices 240 is produced independently from that associated with other sectional-information disc devices 240.

Each of the personal-information disc devices stores inverted information 263 and the personal information 264. The personal information 264 in each device is used by a respective employee-individual belonging to a respective business office and is managed by the respective one of the client apparatuses 270.

The personal information 264 is produced, similarly to the production of the sectional information 244, in the respective business office so that it is produced independently from that managed by other client apparatuses. The general information 214 is common to the respective supervisory sections and the respective business offices. Particularly in such a case, the top-down search method carried out in the system of FIG. 19 is effective.

Acquisition information 266 obtained as a result of information retrieval is added to the personal information 264. The inverted file 263 comprises information which is automatically produced from the personal information 264 and is to be used for information retrieval.

The directory information 212 and 242 comprises hierarchy information, such as mentioned above, which is used for hierarchically managing the positions of the various information units through the LAN. In the information retrieval system in the second embodiment shown in FIG. 19, each of the general-information disc devices 210 and sectional-information disc devices 240 stores a respective one of the directory information sets 212 and 242. Such a storage-information arrangement is made in order to implement search operation in the above-mentioned top-down manner starting from the higher hierarchy-information to the lower hierarchy-information.

By using the directory information 212 and 242, the search operation is automatically carried out as follows: A user inputs a retrieval command to the relevant client apparatus 270 through the input device 101. Then, the relevant search request means 278 requests the highest-hierarchy general-information server apparatus 230's search. Then, if necessary, the search is performed on the relevant sectional information 244 subsequent to the search performed on the general information 214. The search continuation from the search on the general information 214 to the search on the sectional information 244 is controlled in accordance with the relevant directory information 212. Further, then, if necessary, the search is performed on the personal information 264 subsequent to the search performed on the above sectional information 244. The search continuation from the search on the sectional information 244 to the search on the personal information 264 is controlled in accordance with the relevant directory information 242.

Thus, the predetermined information may be retrieved (acquisition information 266) as a result of a search on the information 264, 244 and 214, sequentially in the top-down manner. In this construction, it is not necessary for the personal-information disc device 260 to store directory information.

An operation flow of the information retrieval system in the second embodiment of the present invention will now be described with reference to FIGS. 19–40.

Figure 20:
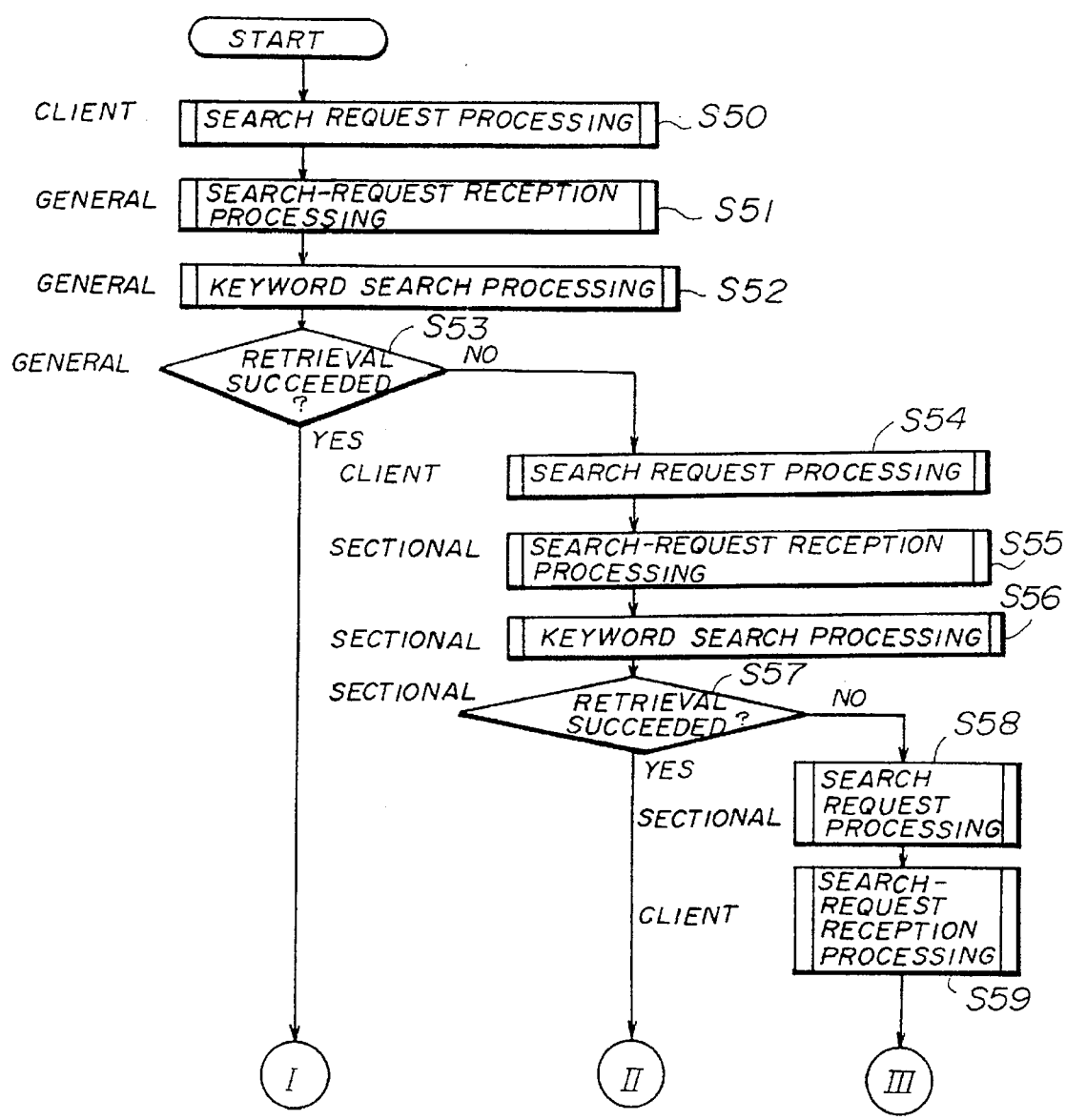
FIGS. 20 and 21 show an operation flow associated with a main routine in the system shown in FIG. 2.

After the particular client apparatus 270 receives a retrieval command from a user as the user inputs a certain keyword thereto, search request means 278 of the relevant client apparatus 270 carries out the search request processing S50 of FIG. 20.

Figure 22:
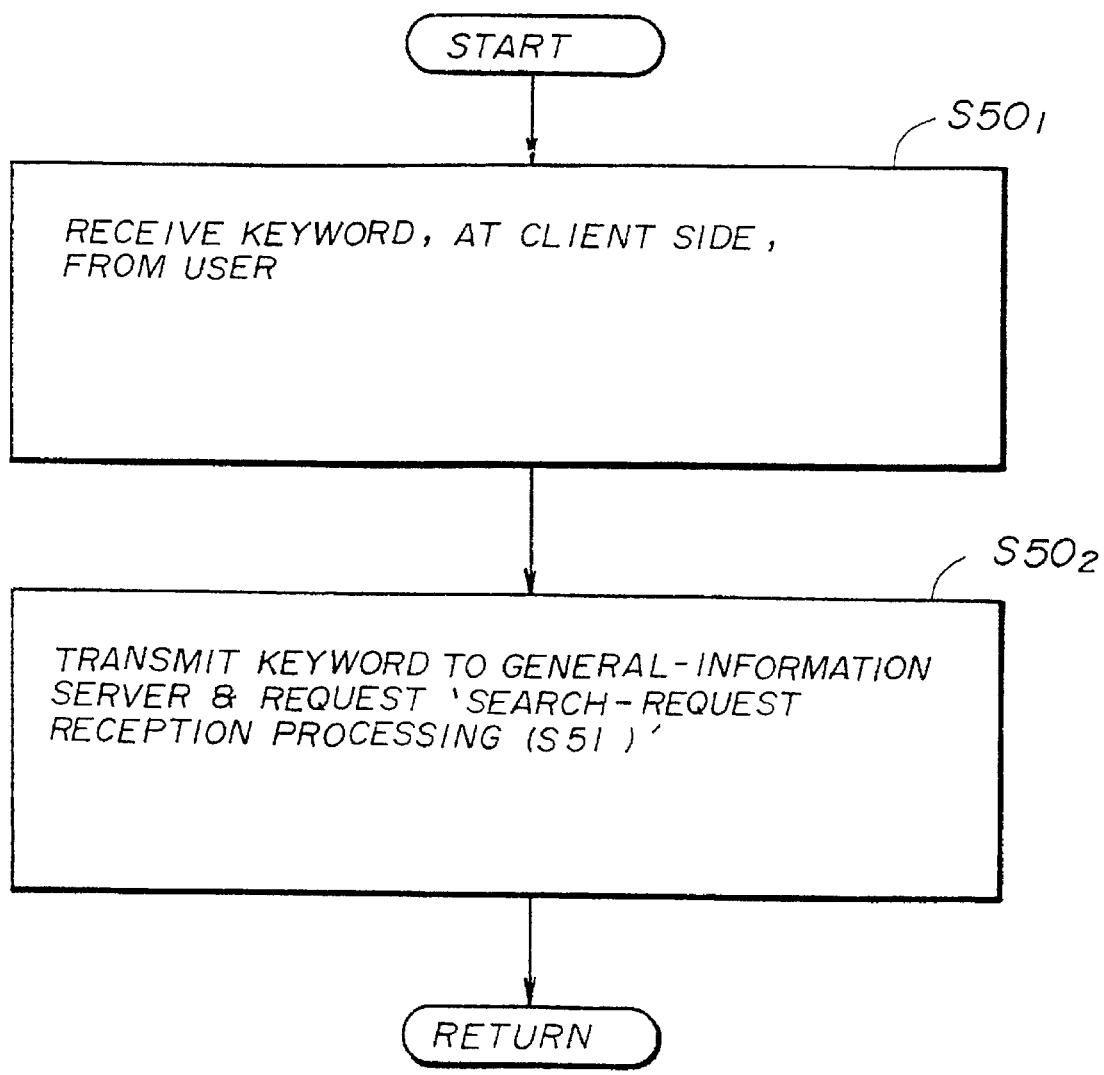
FIG. 22 shows a detailed operation flow of search request processing (step S50) in the operation flow of FIG. 20.

That is, as shown in FIG. 22, the search request means 274, after receiving the keyword from the user in $S50_1$, sends the received keyword to the highest-hierarchy general-information server apparatus 230 in the headquarters and then requests search-request reception processing S51, in $S50_2$. Then, execution returns to the above-mentioned main routine.

Figure 23:
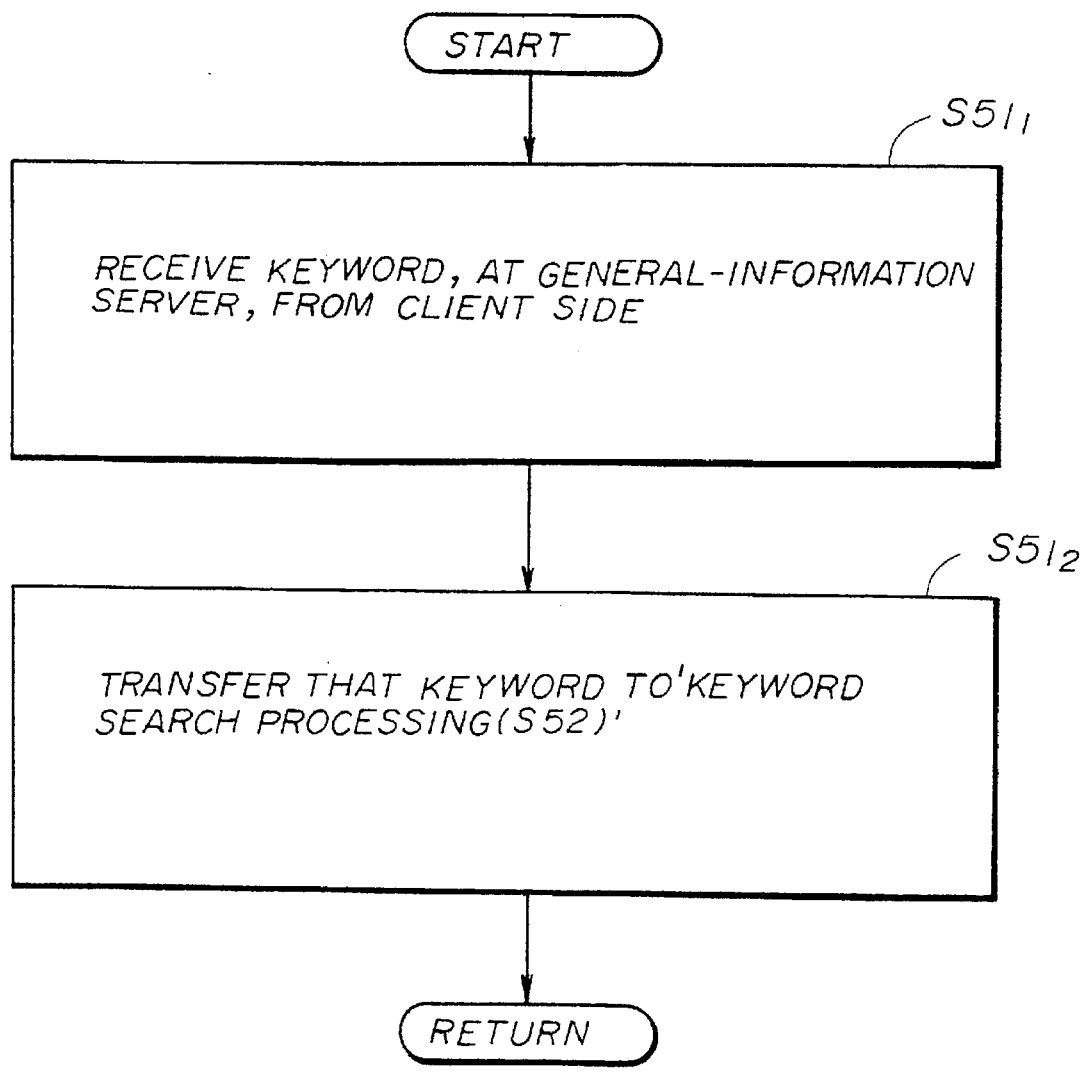
FIG. 23 shows a detailed operation flow of search request reception processing (step S51) in the operation flow of FIG. 20.

The search-request reception means 231 in the general-information server apparatus 230 carries out the above search-request reception processing S51 as shown in FIG. 23.

That is, in $S51_1$, the search-request reception means 231 receives the above keyword from the above client apparatus 270. Then, in $S51_2$, the received keyword is transferred to keyword search processing S52 of the main routine so that execution returns to the main routine.

Figure 24:
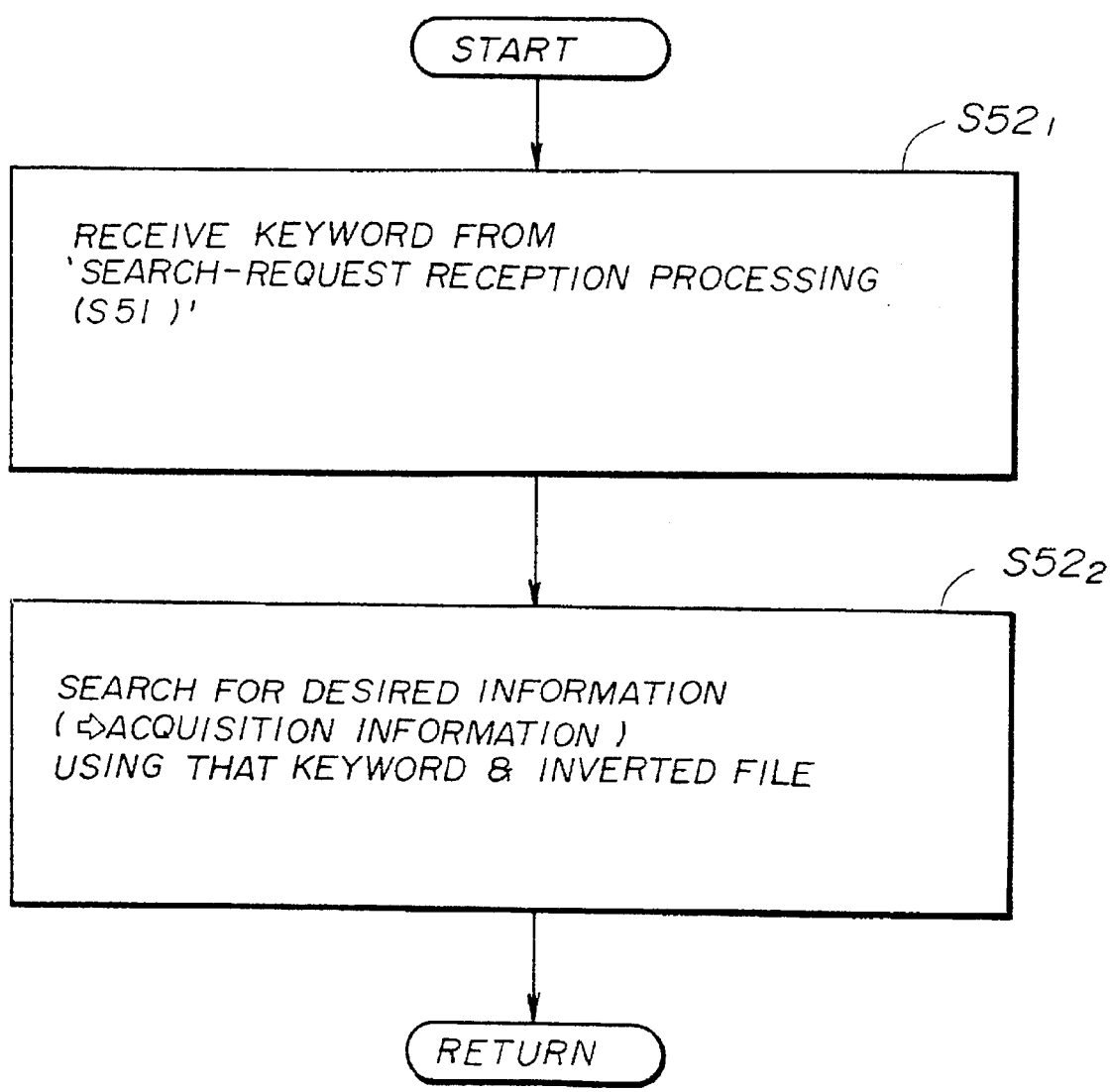
FIG. 24 shows a detailed operation flow of keyword search processing (step S52) in the operation flow of FIG. 20.

The keyword search means 252 carries out the keyword search processing S52 as shown in FIG. 24.

That is, in $S34_1$, the keyword search means 232 receives the above keyword from the search-request reception processing S51 carried out by the search-request reception means 231. Then, in $S52_2$, the keyword search means 232 uses the received keyword and the relevant inverted file 213 so as to search the general information 214. Then, execution returns to the main routine.

Figure 21:
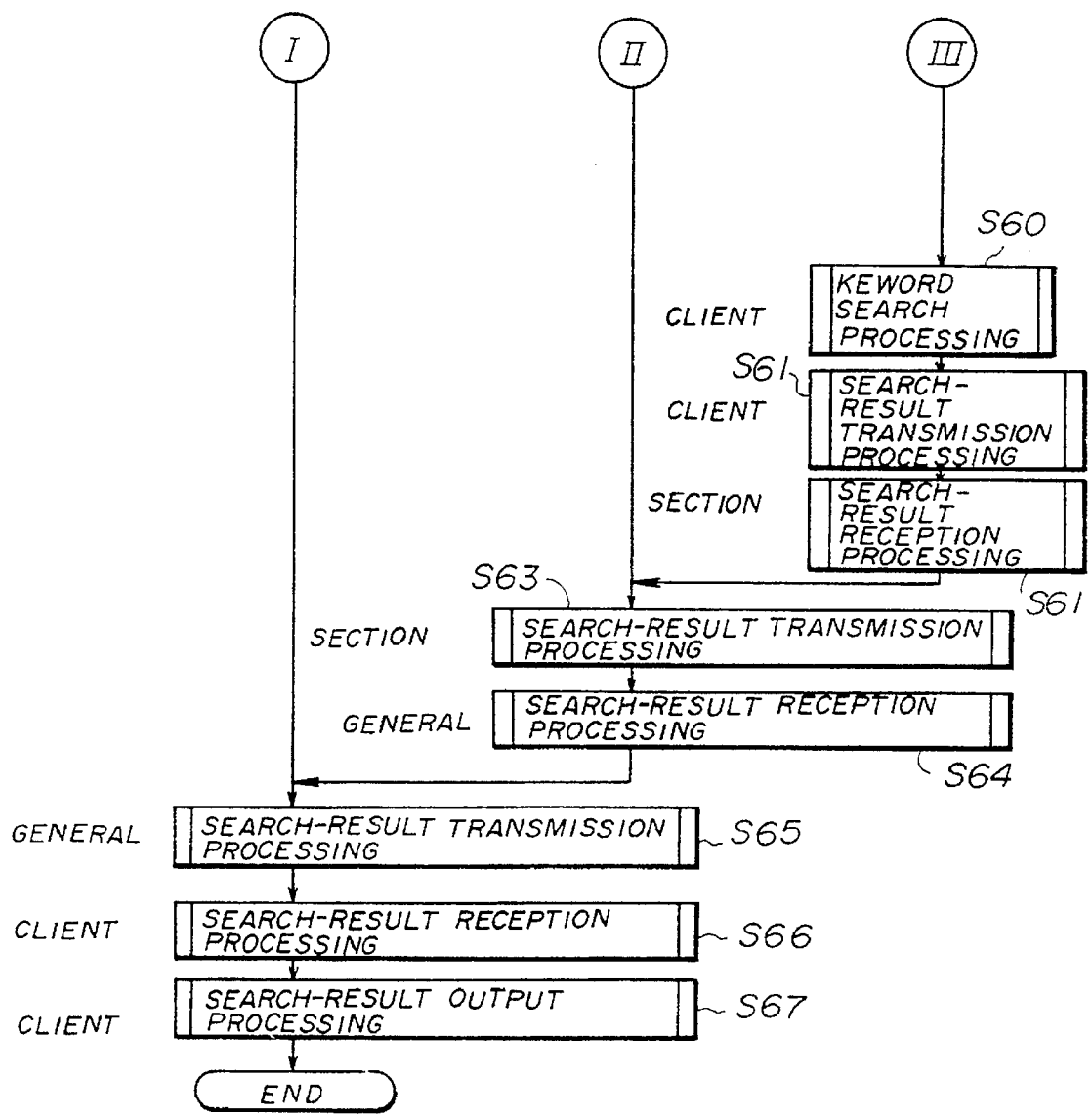

Subsequent to the above keyword search processing S52, the check means 233 carries out determination processing S53. As a result, if the above user-desired information has been retrieved (YES), then the search-result transmission means 235, search-result receiving means 276 and search-result output means 277 carries out the below-described processing S65–S67 (FIG. 21). Thus, the retrieved information (search result) is output through the lowest-hierarchy client apparatus 270.

If the desired information could not be retrieved (NO) as determined in the determination S53, the search request means 234 carries out search request processing S54.

Figure 25:
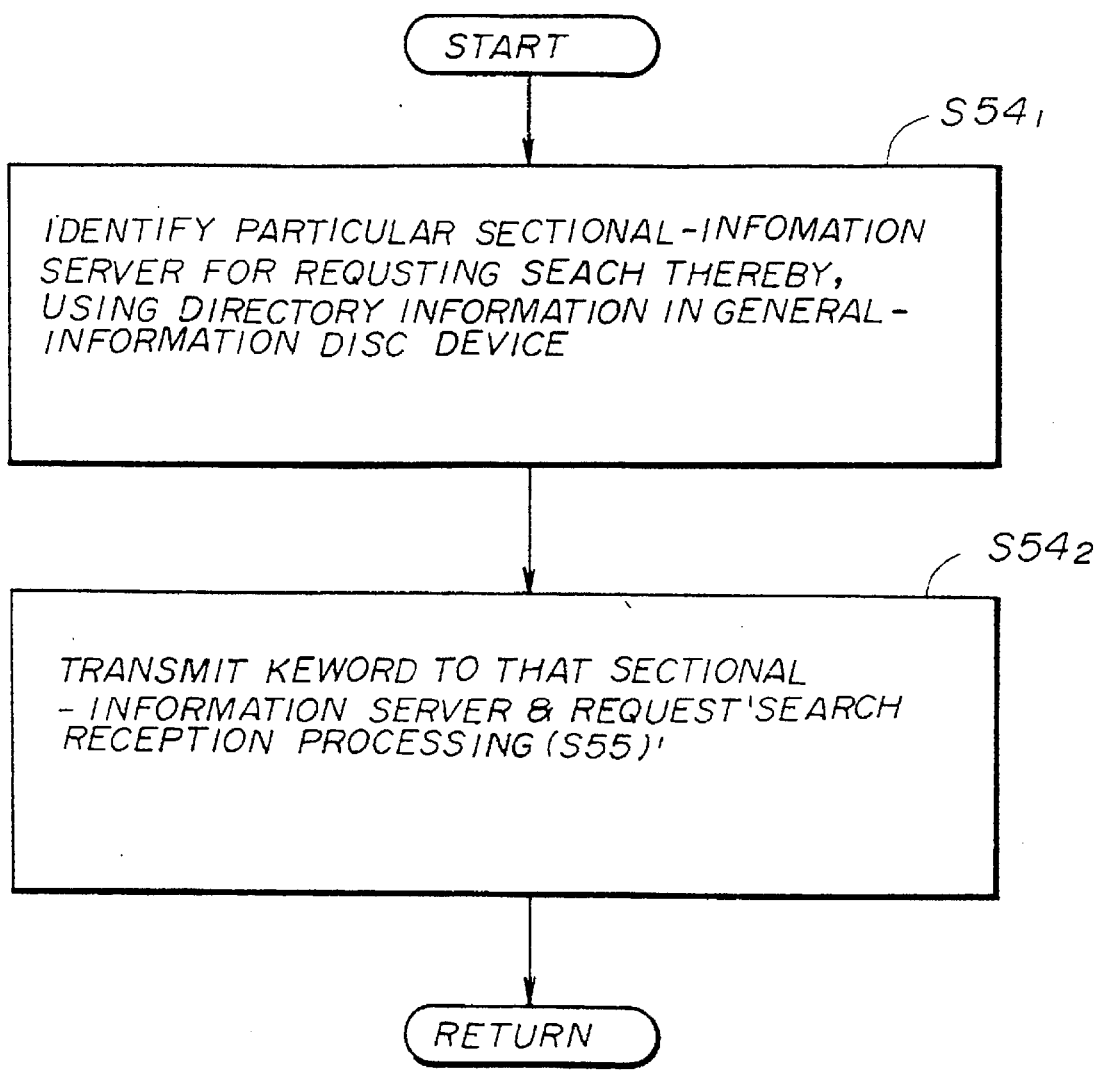
FIG. 25 shows a detailed operation flow of search request processing (step S54) in the operation flow of FIG. 20.

That is, as shown in FIG. 25, in $S54_1$, the search request means 234 uses the directory information 212 stored in the general-information disc device 210. Thus, the means 234 identifies the appropriate sectional-information server apparatus from among the inter-linked middle-hierarchy (respective-supervisory-section) plurality of sectional-information server apparatuses. The identified sectional-information server apparatus is one from which the search request means 234 is to request the relevant search.

Subsequently, in $S54_2$, the search request means 234 transmits the above keyword to the thus identified sectional-information server apparatus 250. Then, the means 214 requests search-request reception processing S55 in the main routine so that execution returns to the main routine.

Figure 26:
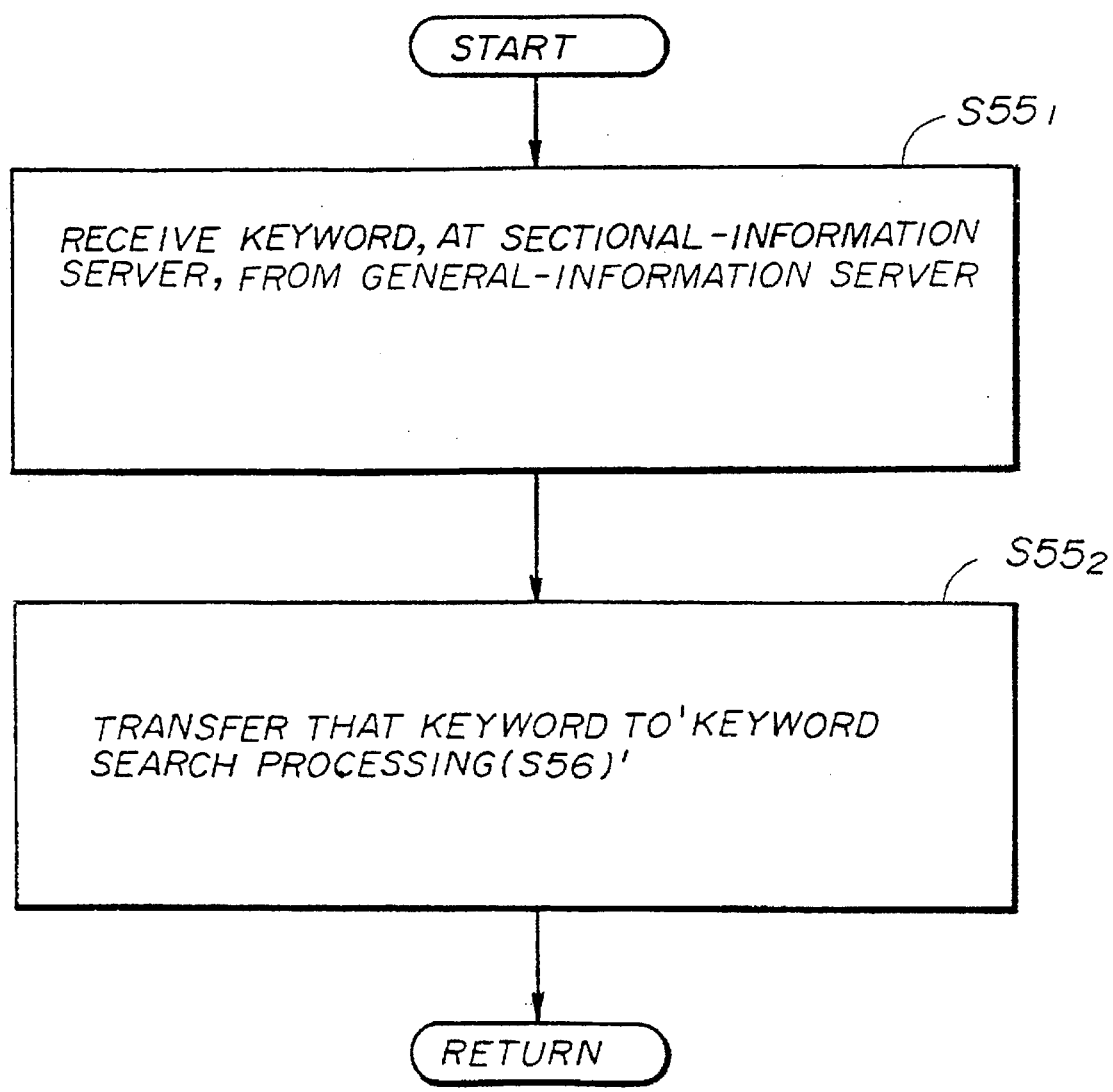
FIG. 26 shows a detailed operation flow of search request reception processing (step S55) in the operation flow of FIG. 20.

The search-request receiving means 251 of the relevant sectional-information server apparatus 250 carries out the above search-request reception processing S55 as shown in FIG. 26.

That is, in $S55_1$, the above search-request receiving means 251 receives the above keyword from the general-information server apparatus 230. Then, in $S55_2$, the means 251 transfers the received keyword to keyword search processing S56 in the main routine so that execution returns to the main routine.

Figure 27:
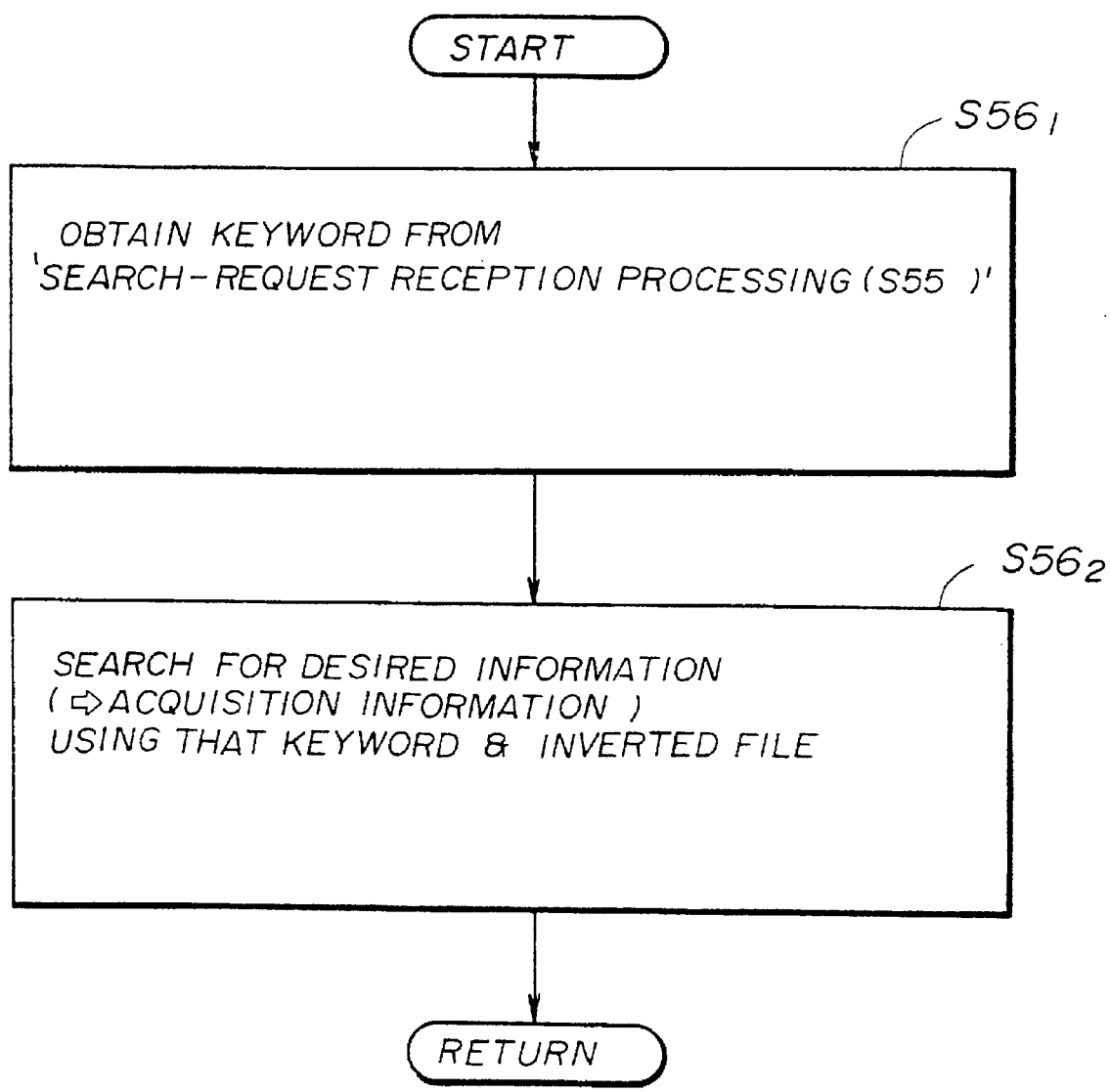
FIG. 27 shows a detailed operation flow of keyword search processing (step S56) in the operation flow of FIG. 20.

The relevant keyword search means 252 carries out the above keyword search processing S56 as shown in FIG. 27.

That is, in $S56_1$, the keyword search means 252 receives the relevant keyword from the above search-request reception processing S55 performed by the search-request receiving means 251. Then, in $S56_2$, the means 252 uses the received keyword and the relevant inverted file 243 so as to search the relevant sectional information 244 for the relevant desired information. After the desired information has been retrieved from the sectional information 244, execution returns to the main routine.

Subsequent to the above keyword search processing S56, the check means 253 carries out determination processing S57. As a result, if the above user-desired information has been retrieved (YES), then the search-result transmission means 255, search-result receiving means 236, search-result transmission means 235, search-result receiving means 276, and search-result output means 277 carry out the below-described processing S63–S67 (FIG. 21). Thus, the retrieved information (search result) is output through the lowest-hierarchy client apparatus 270.

If the desired information could not be retrieved (NO) as determined in the determination S57, the search request means 254 carries out search request processing S58.

Figure 28:
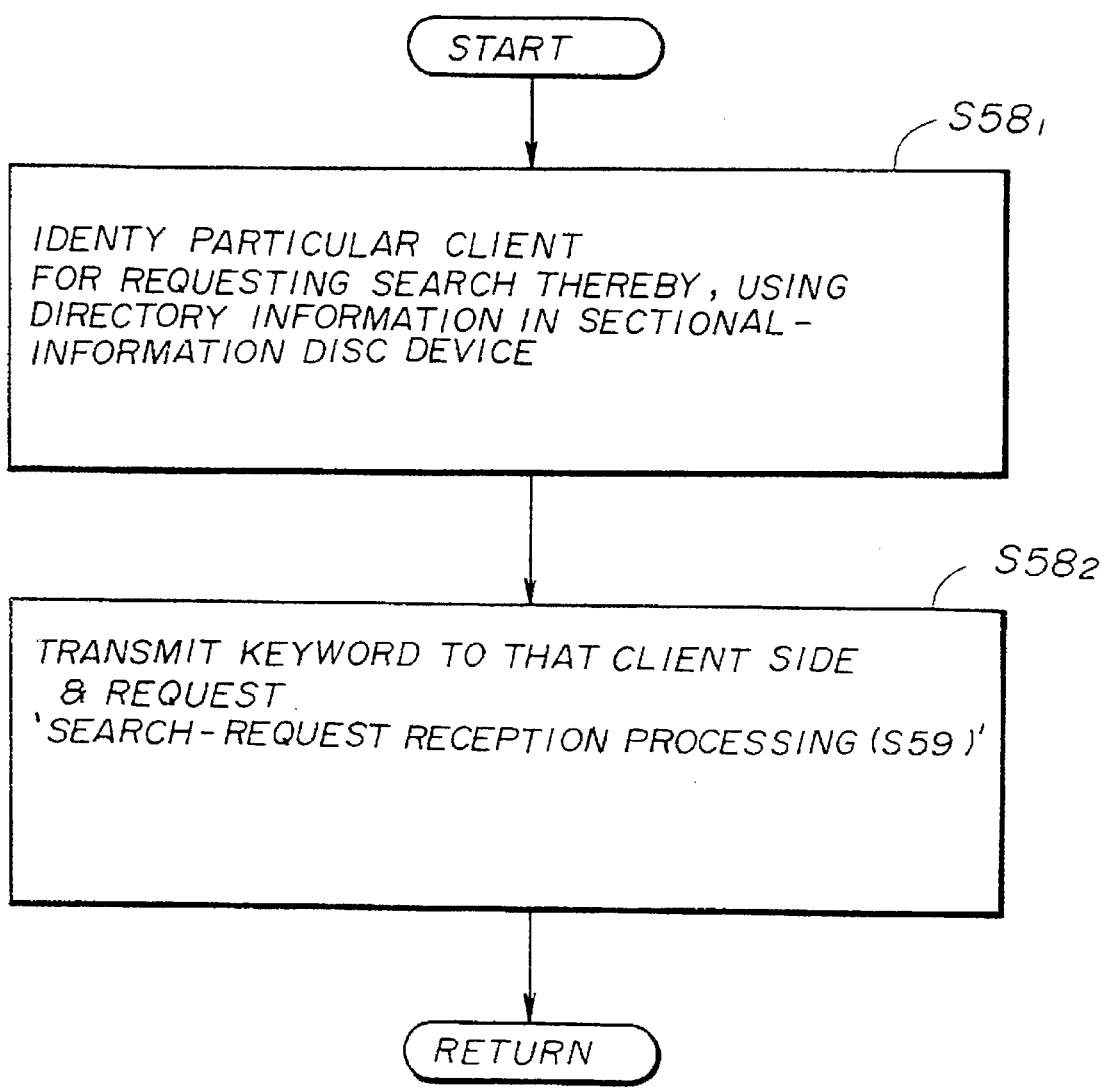
FIG. 28 shows a detailed operation flow of search request processing (step S58) in the operation flow of FIG. 20.

That is, as shown in FIG. 28, in $S58_1$, the search request means 254 uses the directory information 242 stored in the sectional-information disc device 240. Thus, the means 254 identifies the appropriate client apparatus from among the inter-linked lowest-hierarchy (respective-business-office) plurality of sectional-information server apparatuses. The identified client apparatus is one from which the search request means 254 is to request the relevant search.

The above identified client apparatus is one which is different from one which has requested the relevant retrieval. The identified client apparatus is one provided in another business office and to which normally the user who has requested the relevant retrieval does not belong., However, the following situation is also possible: Even though the user believes the desired information is not stored in the personal-information disc device 260 in the business office to which the user belongs to, the above desired information is in fact stored there. In that case, the above identified client apparatus is in the business office to which the user himself or herself belongs.

Subsequently, in $S58_2$, the search request means 254 transmits the above keyword to the thus identified client apparatus 270. Then, the means 254 requests search-request reception processing S59 in the main routine so that execution returns to the main routine.

Figure 29:
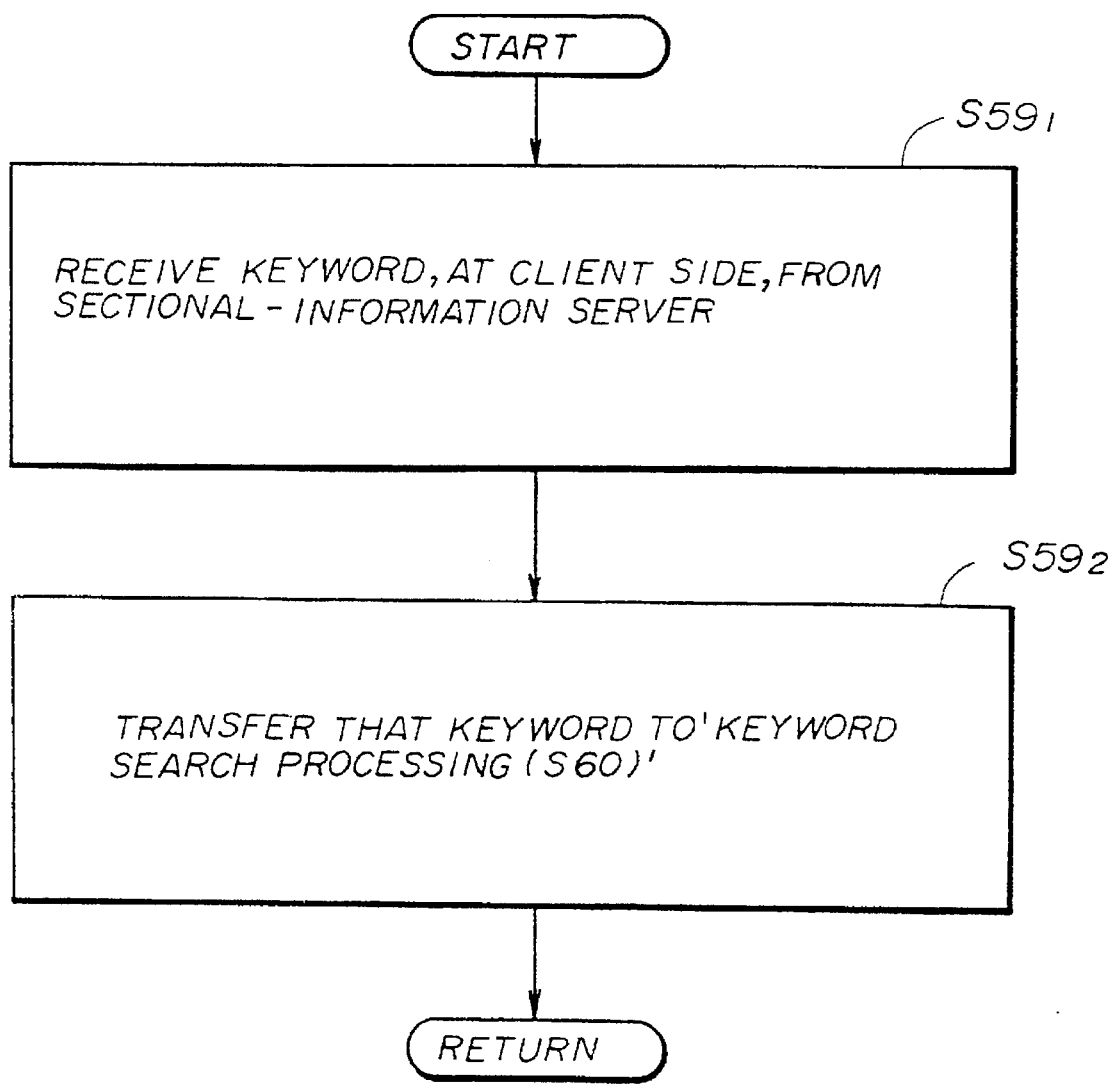
FIG. 29 shows a detailed operation flow of search request reception processing (step S59) in the operation flow of FIG. 20.

The search-request receiving means 271 of the relevant client apparatus 270 carries out the above search-request reception processing S59 as shown in FIG. 29.

That is, in $S59_1$, the above search-request receiving means 271 receives the above keyword from the sectional-information server apparatus 250. Then, in $S55_2$, the means 271 transfers the received keyword to keyword search processing S60 in the main routine so that execution returns to the main routine.

Figure 30:
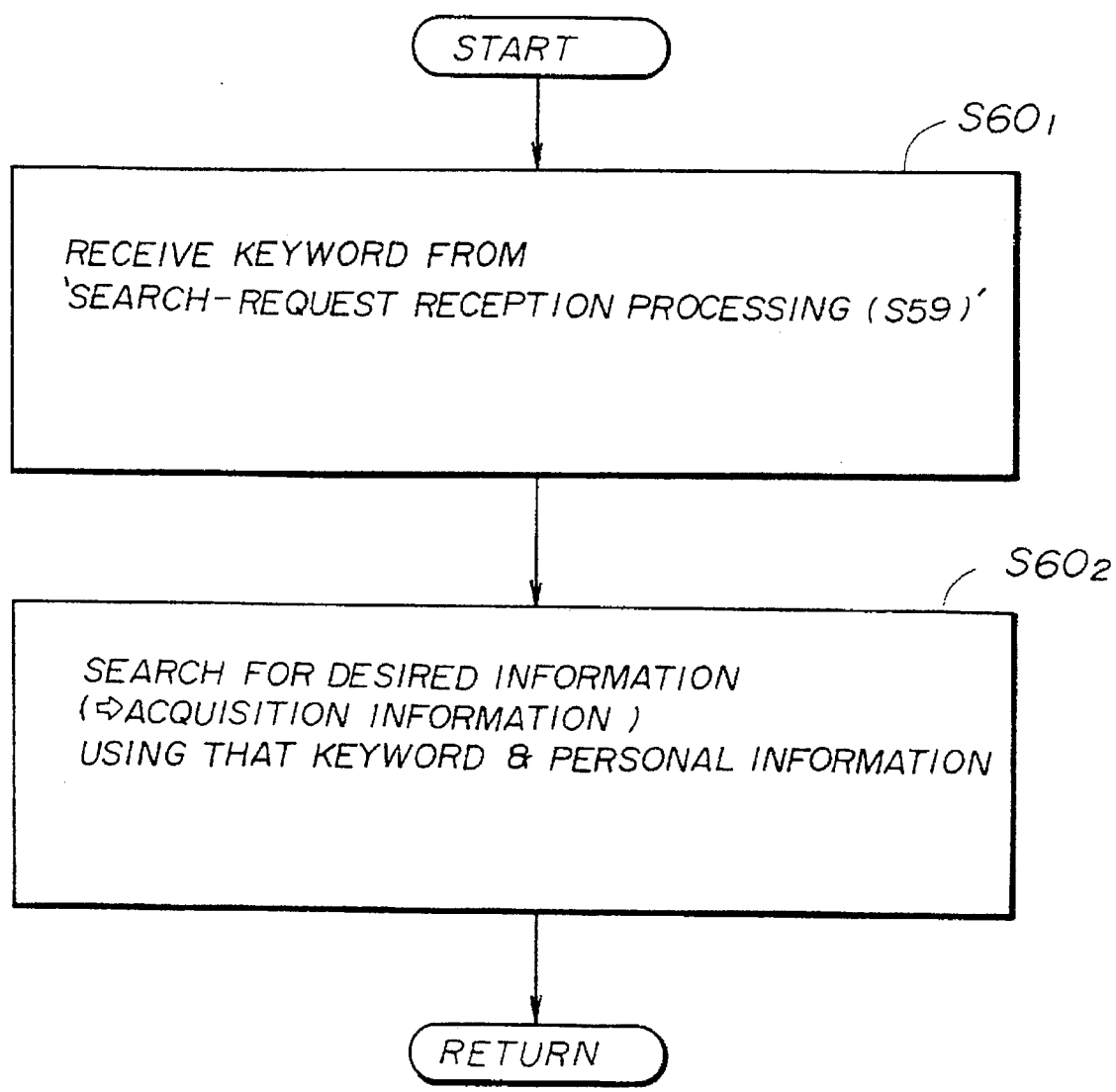
FIG. 30 shows a detailed operation flow of keyword search processing (step S60) in the operation flow of FIG. 21.

The relevant keyword search means 272 carries out the above keyword search processing S60 as shown in FIG. 30.

That is, in $S60_1$, the keyword search means 272 receives the relevant keyword from the above search-request reception processing S59 of FIG. 20 performed by the search-request receiving means 271. Then, in $S60_2$, the means 272 uses the received keyword and the relevant inverted file 263 to search the relevant personal information 264 for the relevant desired information. After the desired information has been retrieved from the sectional information 244, execution returns to the main routine.

Then, if the desired information has been retrieved as a result of the search of the personal information 244, the subsequent processing processes S61–S67 are carried out and the retrieved information is, being acquisition information, stored by means of the relevant personal-information disc device 260.

Figure 31:
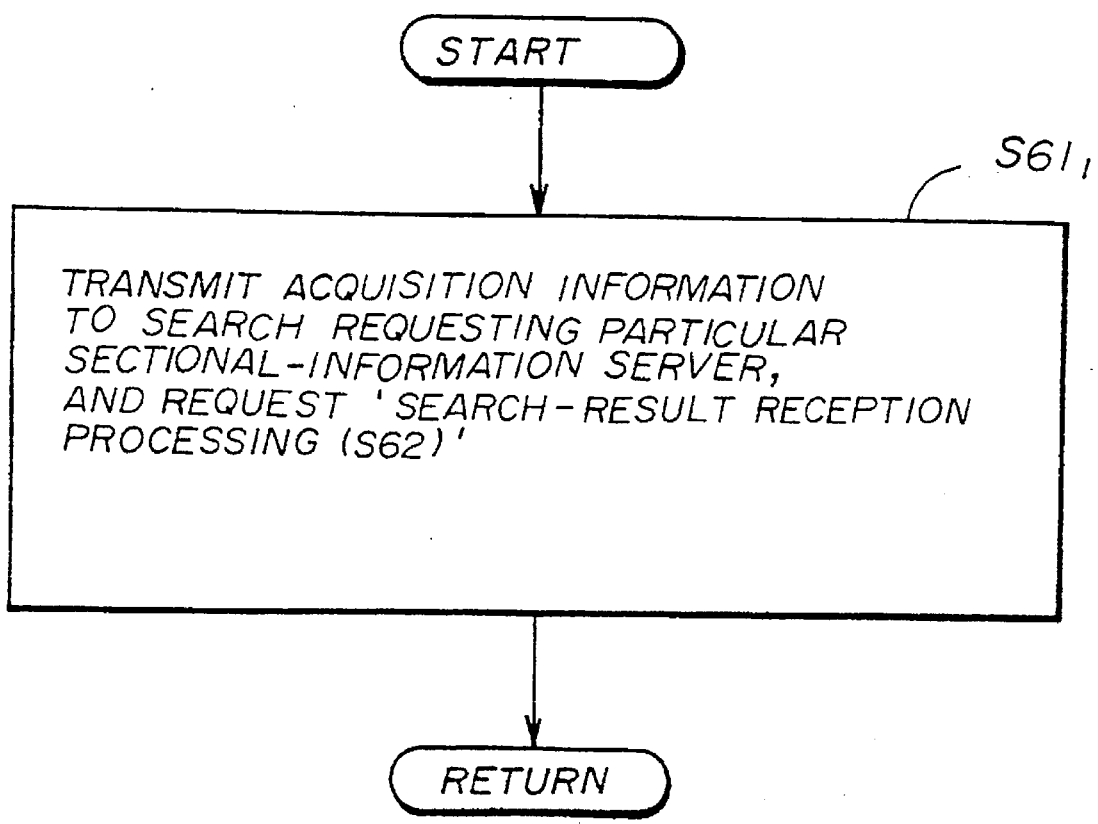
FIG. 31 shows a detailed operation flow of search result transmission processing (step S61) in the operation flow of FIG. 21.

That is, the search-result transmission means 275 carries out search-result transmission processing S61 as shown in FIG. 31.

That is, in $S61_1$, the search-result transmission means 275 transmits the above relevant acquisition information to the particular sectional-information server apparatus 150, which has previously requested the relevant retrieval. Then, the means 275 requests search-result reception processing S62 in the main routine so that execution returns to the main routine.

Figure 32:
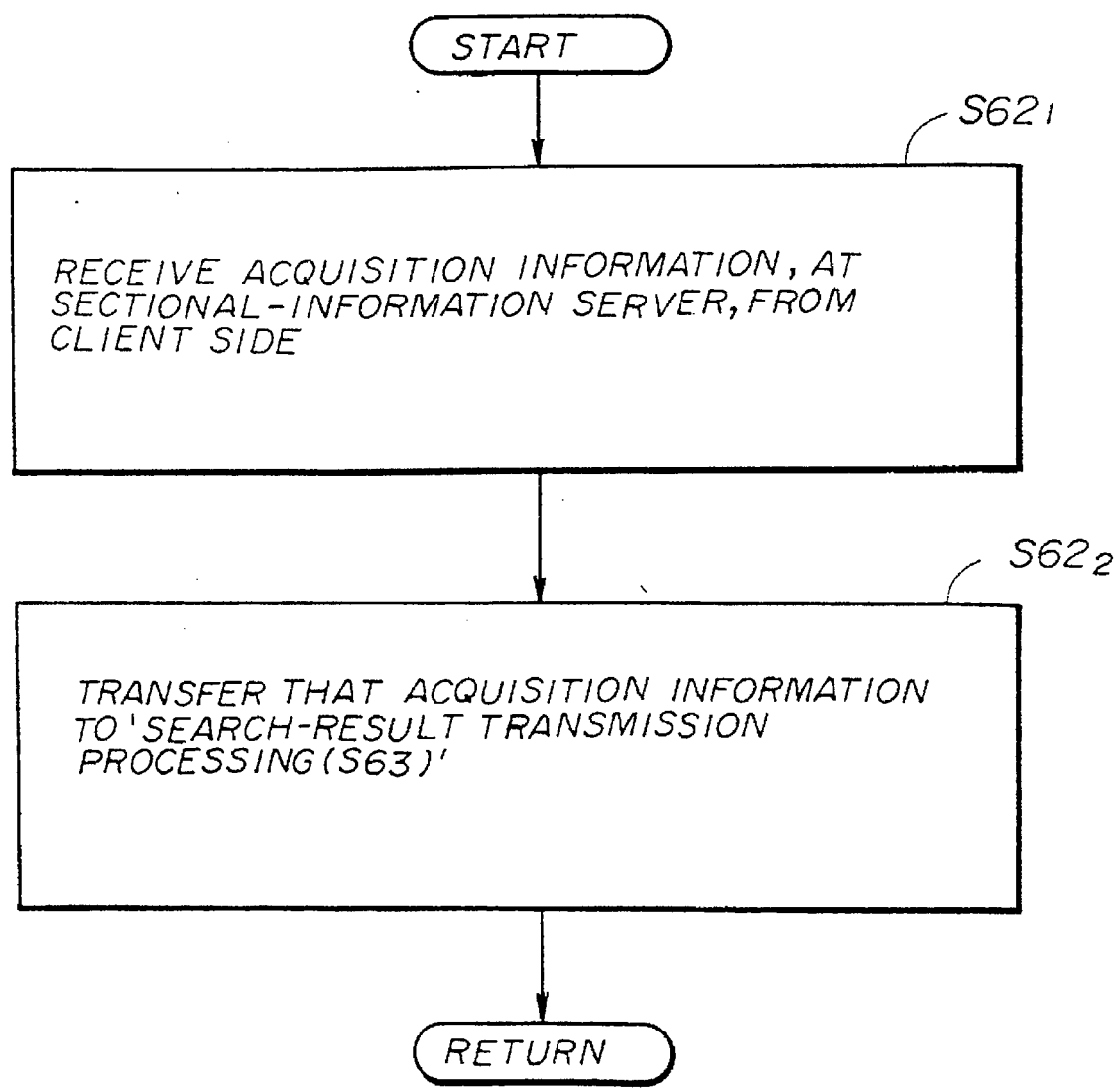
FIG. 32 shows a detailed operation flow of search result reception processing (step S62) in the operation flow of FIG. 21.

Then, the search-result receiving means 256 of the relevant sectional-information server apparatus 250 carries out the above search-result reception processing S62 as shown in FIG. 32.

That is, in $S62_1$, the search-result receiving means 256 receives the above acquisition information from the client apparatus 270. Then, the means 256, in $S62_2$, transfers the received acquisition information to search-result transmission processing S63 in the main routine so that execution returns to the main routine.

Figure 33:
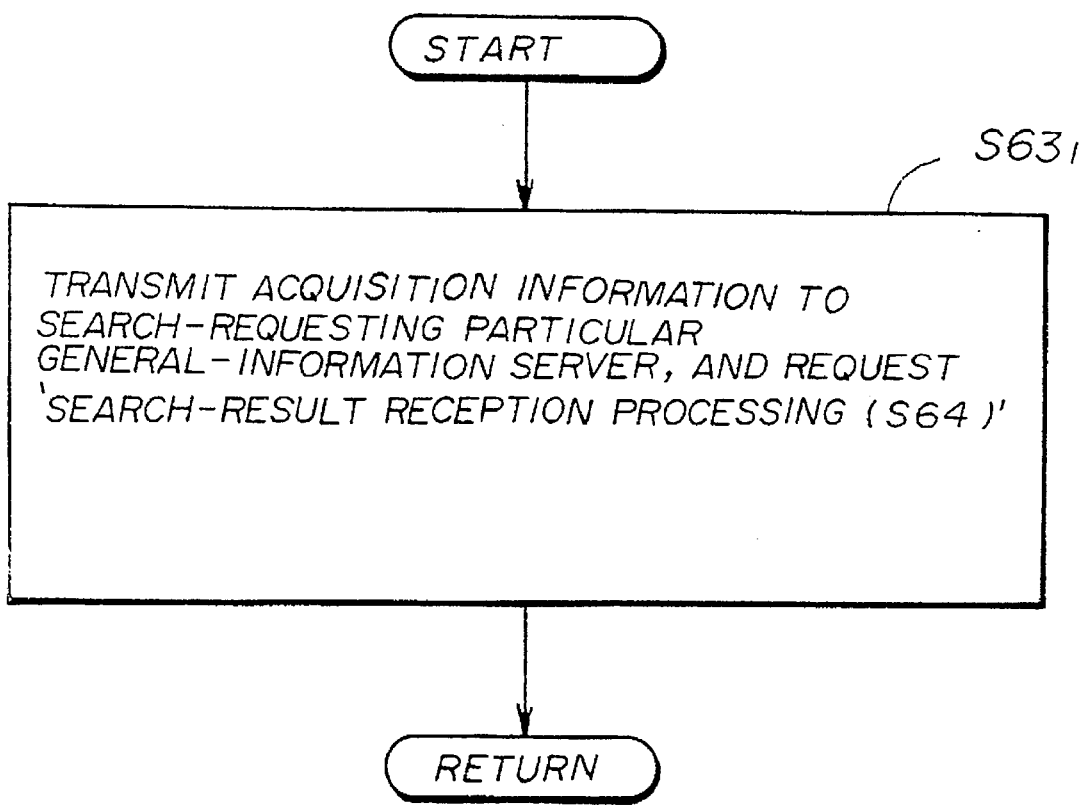
FIG. 33 shows a detailed operation flow of search result transmission processing (step S63) in the operation flow of FIG. 21.

The relevant search-result transmission means 255 carries out the above search-result transmission processing S63 as shown in FIG. 33.

That is, in $S63_1$, the search-result transmission means 255 transmits the above acquisition information to the general-information server apparatus 230 which has previously requested the relevant retrieval. Then, the means 255 requests search-result reception processing S64 in the main routine so that execution returns to the main routine.

Figure 34:
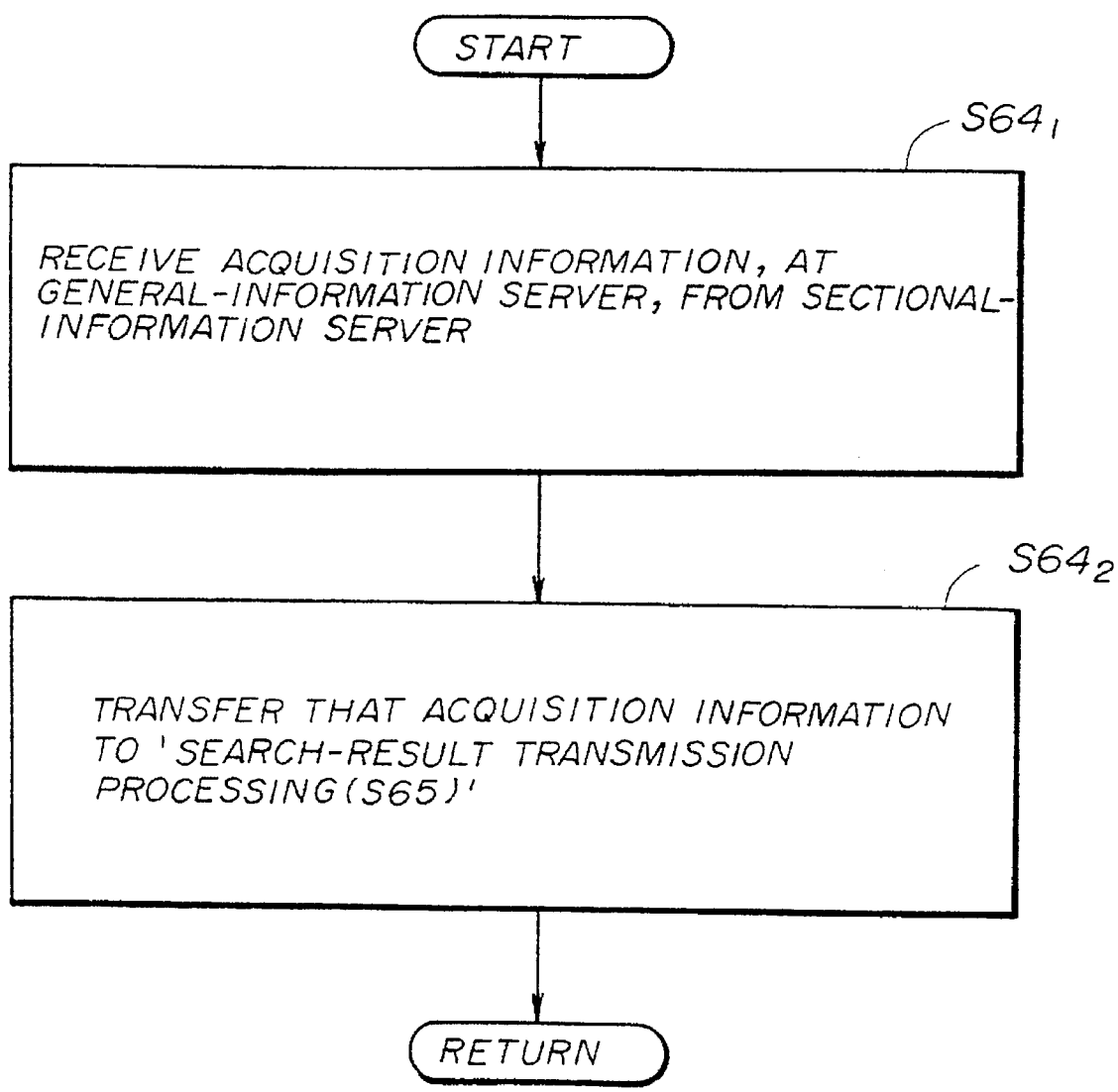
FIG. 34 shows a detailed operation flow of search result reception processing (step S64) in the operation flow of FIG. 21.

The search-result receiving means 236 of the above particular client apparatus 230 carries out the above search-result reception processing S64 as shown in FIG. 34.

That is, in $S64_1$, the search-result receiving means 236 receives the above relevant acquisition information from the above sectional-information server apparatus 250. Then, in $S64_2$, the means 236 transfers the received acquisition information to search-result transmission processing S65 in the main routine so that execution returns to the main routine.

Figure 35:
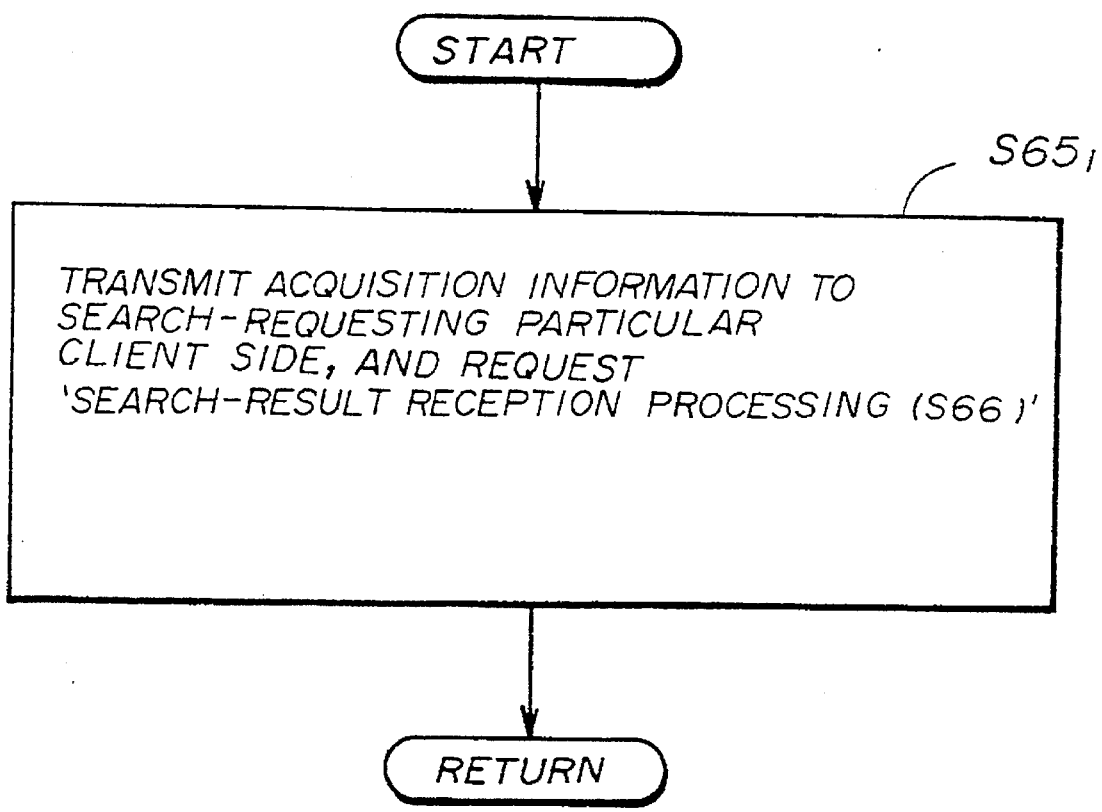
FIG. 35 shows a detailed operation flow of search result transmission processing (step S65) in the operation flow of FIG. 21.

The relevant search-result transmission means 235 carries out the above search-result transmission processing S65 as shown in FIG. 35.

That is, in $S65_1$, the search-result transmission means 235 transmits the above acquisition information to the client apparatus 270 which has previously requested the relevant retrieval. Then, the means 235 requests search-result reception processing S66 in the main routine so that execution returns to the main routine.

Figure 36:
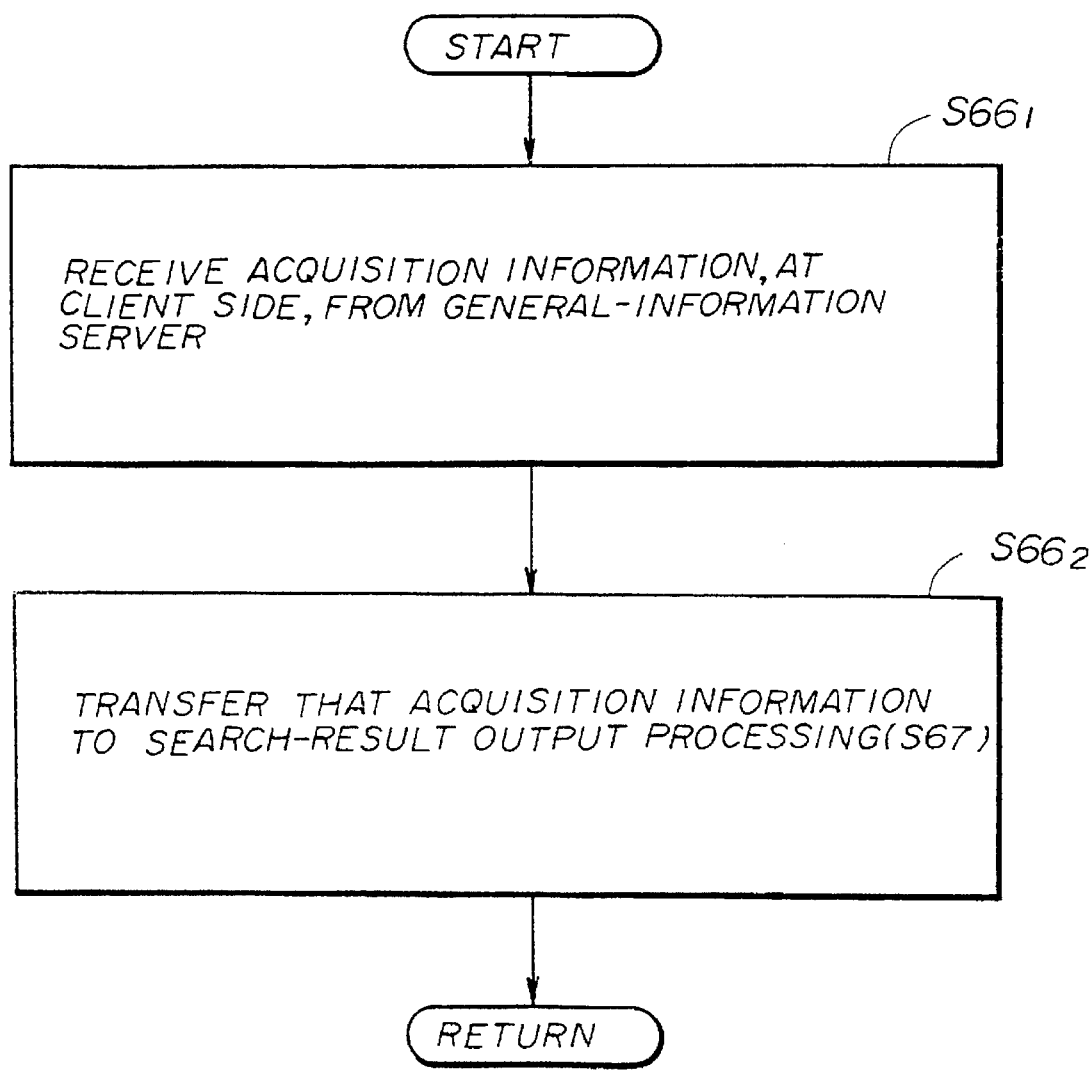
FIG. 36 shows a detailed operation flow of search result reception processing (step S66) in the operation flow of FIG. 21.

The search-result receiving means 276 of the above particular client apparatus 270 carries out the above search-result reception processing S66 as shown in FIG. 36.

That is, in $S66_1$, the search-result receiving means 276 receives the above relevant acquisition information from the general-information server apparatus 230. Then, in $S66_2$, the means 276 transfers the received acquisition information to search-result output processing S67 in the main routine so that execution returns to the main routine.

Figure 37:
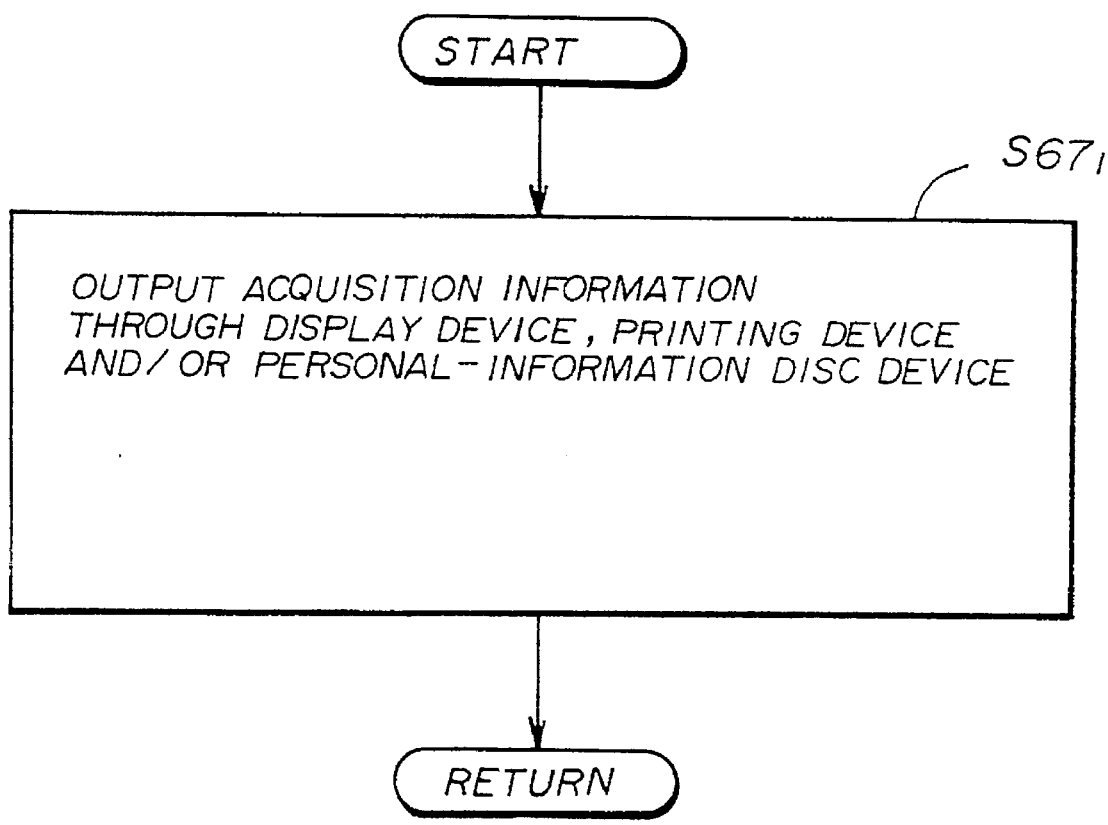
FIG. 37 shows a detailed operation flow of search result output processing (step S67) in the operation flow of FIG. 21.

The search-result output means 277 of the above client apparatus 270 carries out the above search-result output processing S67, the last of the main routine of FIG. 3, as shown in FIG. 37.

That is, in $S67_1$, the search-result output means 277 displays the above relevant acquisition information on the relevant display device 102, and makes the relevant personal-information disc device 260 store it, if necessary. Further, if necessary, this acquisition information is printed out through the relevant printing device 103. Then, execution returns to the main routine and then the relevant search/retrieval processing has been completed.

Thus, in the information retrieval system in the second embodiment of the present invention, the lower-hierarchy associated information is automatically searched using the relevant directory information if desired item of information could not be retrieved (found) as a result of a search performed on each hierarchy-associated information. Thus, the search may be performed automatically in the top-down manner starting from the general-information server apparatus 230 to the appropriate client apparatus 270, so that the desired information may be retrieved.

Consequently, it is possible to realize information retrieval operation which is efficient and has flexibility.

An information retrieval system in a first modified example of the above second embodiment of the present invention will now be described with reference to FIG. 38. In the system shown in FIG. 38, the full-text search is carried out in the top-down manner whereas the keyword search is carried out in the top-down manner in the system shown in FIG. 19 as described above.

That is, a general-information server apparatus 230a has a full-text search means 232a instead of the keyword search means 232 provided in the general-information server apparatus 230. Similarly, a sectional-information server apparatus 250a has a full-text search means 252a instead of the keyword search means 252 provided in the sectional-information server apparatus 250. Further, a client apparatus 270a has a full-text search means 272a instead of the keyword search means 272 provided in the client apparatus 270.

Then, according to the above-described construction, the full-text search is carried out in a top-down manner using the following processing: The keyword search processing in each of S52, S56 and S60 in the operation flow shown in FIGS. 20 and 21 is replaced by the full-text search processing.

Figure 38:
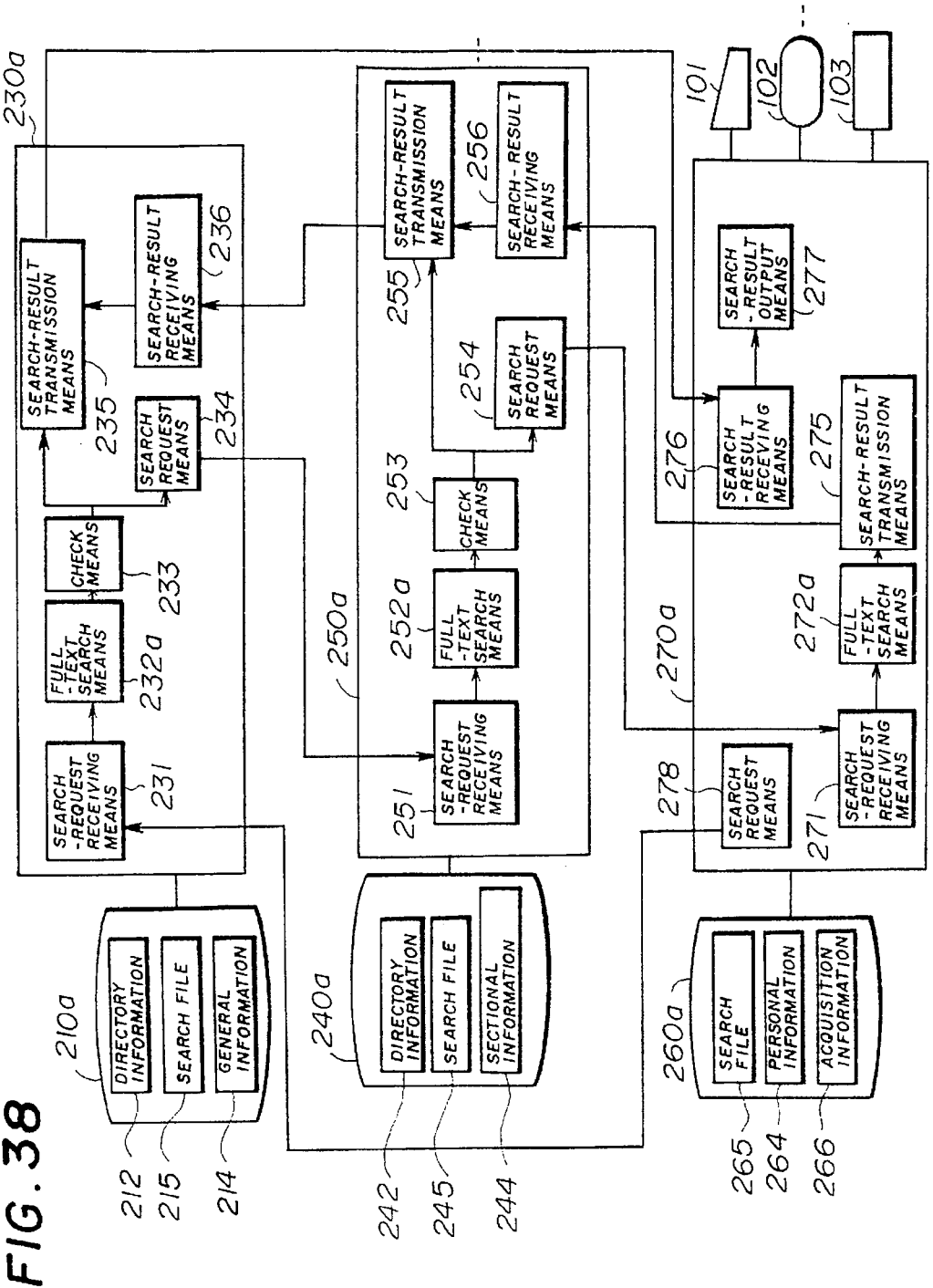
FIG. 38 shows an information retrieval system in a first modified embodiment resulting from modifying the information retrieval system in the second embodiment of the information retrieval system according to the present invention.

Further, as shown in FIG. 38, a search file 215, instead of the inverted file 213 shown in FIG. 19, is stored by means of the general-information disc device 210a. A search file 245, instead of the inverted file 243 shown in FIG. 2, is stored by means of the sectional-information disc device 240a. A search file 265, instead of the inverted file 263 shown in FIG. 19, is stored by means of the personal-information disc device 260a.

The search file 215 is one automatically produced from the general information 214 by compression thereof so that almost all of the contents of the general information 214 are maintained during the compression. The search file 245 is one automatically produced from, by compressing of, the sectional information 244 so that almost all of the contents of the sectional information 244 are maintained during the compression. The search files 265 is similarly produced from the personal information 264.

As described above, the full-text search may be implemented using the respective search files 265, 245 and 215.

An information retrieval system in a second modified example of the above second embodiment of the present invention will now be described with reference to FIG. 39.

In the system of FIG. 39, a magneto-optical disc device 240b is employed instead of the sectional-information disc device 240 comprising a hard disc shown in FIG. 19. Similarly, an magneto-optical disc device 260b is employed instead of the personal-information disc device 260 comprising a hard disc.

As a result of the above-described modification, the following operation manner may be implemented: A magneto-optical (information storage) disc 241 is provided in which the directory information 242, inverted file 243 and sectional information 244 is stored. Then, the above magneto-optical disc 241 is loaded into the magneto-optical disc device 240b. The magneto-optical disc 241 in the disc device 240b may be replaced by another magneto-optical disc in which other information is stored. As a result of such a replacement, additional sectional information may be used if it is appropriate, thus increasing the amount of sectional information available.

Further, it is also possible to switch the search direction between the above-described bottom-up manner direction and the below-described top-down manner direction. This switching is implemented by replacing the magneto-optical disc 241 by another magneto-optical disc in which different directory information 242 from that stored in the first magneto-optical disc 241 is stored.

Further, the following operation mode may also be implemented: A magneto-optical disc 261 is provided in which inverted file 263, personal information 264 and acquisition information 266 is stored. Then, the above magneto-optical disc 261 is loaded into the magneto-optical disc device 260b. The magneto-optical disc 261 in the disc device 260b may also be replaced by another magneto-optical disc in which personal information which different from that stored in the first magneto-optical disc 261 is stored. As a result of such a replacement, the amount of personal information used may be increased if necessary.

In the second modified example, shown in FIG. 39, of the second embodiment of the present invention, the keyword search in a top-down manner may be carried out in accordance with the operation flow shown in FIGS. 20 and 21.

An information retrieval system in a third modified example of the above second embodiment of the present invention shown in FIG. 19 will now be described with reference to FIG. 40.

In the system of FIG. 40, a magneto-optical disc device 240b is employed instead of the sectional-information disc device 240 comprising a hard disc shown in FIG. 19. Similarly, a magneto-optical disc device 260b is employed instead of the personal-information disc device 260 comprising a hard disc.

Further, in the system of FIG. 40, the full-text search is carried out in the top-down manner similarly to the operation in the system shown in FIG. 38.

That is, the general-information server apparatus 230a has the full-text search means 232a, each of the sectional-information server apparatuses 250a has the full-text search means 252a, and each of the client apparatuses 270a has the full-text search means 272a. Then, in this system, the full-text search may be carried out in accordance with an operation flow (not shown in the drawings) similar to that in the system shown in FIG. 38.

In the above-described construction of the system of FIG. 40, the sectional-information server apparatus 250a may carry out the full-text search to be performed on the sectional information 244 accordingly, using the magneto-optical disc device 240b, and thus using the search file 245 stored in the replaceable magneto-optical disc 241a.

Similarly, the client apparatus 270 may carry out the full-text search to be performed on the personal information 264 accordingly, using the magneto-optical disc device 260b, and thus using the search file 265 stored in the replaceable magneto-optical disc 261a.

In the system of FIG. 40, an advantage similar to that obtained in the system shown in FIG. 39 is obtained but as a result of performing the full-text search.

Thus, in each embodiment of the information retrieval system according to the present invention, it is possible to implement an automatic information search to be performed on stored information in either a keyword-search manner or a full-text manner and in either a bottom-up manner starting from the client apparatus side toward the server apparatus side or a top-down manner starting from the server apparatus side toward the client apparatus side. Such information search is realized as a result of the directory information provided for managing the storage positions of the stored information units based on the hierarchical (either the (low hierarchy)-(the high hierarchy), that is, the (client apparatus side)-(the server apparatus side) or the (high hierarchy)-(the low hierarchy), that is, the (server apparatus side)-(the client apparatus side)) concept. The actual search operation is carried out using this directory information.

Further, it is also enabled to manage the stored information in a flexible manner. This can be implemented by providing a magneto-optical disc device as the sectional-information disc device and/or the personal-information disc device. In this construction, it is possible to alter the directory information by replacing the magneto-optical disc. As a result, the search direction may be altered between the bottom-up direction and the top-down direction.

Further, application of the present invention is not limited to the three information system hierarchies such as the highest-hierarchy general-information server apparatus, the middle-hierarchy sectional-information server apparatuses and the lowest hierarchy client apparatuses. These apparatuses constituting the three hierarchies are inter-linked through the LAN. It is also possible to apply the present invention to more than three hierarchies of information system, similar advantages being obtained to those obtained in the above-described embodiments accordingly.

Although in this case the bottom-up direction and top-down direction are described as directions in which the hierarchies of information as searched in the above embodiments, it is also possible to implement the information retrieval system according to the present invention as follows: The relevant directory information is prepared so that the stored information will be searched in an order such as specified personal information, then specified sectional information, then other specified personal information, then other specified sectional information, then other specified personal information, . . . , for example. Further, the following searching order is also possible: Specified general information, then specified sectional information, then specified personal information, then other specified sectional information, . . . , for example. By making such variations in the information searching order, it is possible to provide further flexibility in the searching procedure, thus enabling desired information to be obtained more speedily and efficiently.

Further, the present invention is not limited to the above described embodiments, and variations and modifications may be made without departing from the scope of the present invention.

What is claimed is:

1. An information retrieval system comprising:
   a plurality of management-means hierarchies, each management-means hierarchy of said plurality of management-means hierarchies comprising at least one storing means and one management means, each storing means storing therein information units to be retrieved, a network being common to all management means and each management means managing the respective storing means; and automatic retrieval means for automatically retrieving a predetermined information unit from among the information units stored in each of said storing means using hierarchy information which is used for hierarchically managing the information units stored in each of said storing means;

wherein said plurality of management-means hierarchies comprises at least three hierarchies including:

at least one general-information storing means and one general-information managing means, said general-information storing me, arts storing general information sets which are managed by said general-information managing means which is provided in said network;

a plurality of sectional-information storing means and a plurality of sectional-information management means, said plurality of sectional-information sets which are managed by respective ones of said plurality of sectional-information managing means, said plurality of sectional-information managing means being provided in said network; and a plurality of personal-information storing means and a plurality of personal-information management means, said plurality of personal-information sets which are managed by respective ones of said plurality of personal-information managing means, said plurality of personal-information managing mean being provided in said network; and wherein said automatic retrieval means retrieves a predetermined information unit from among said general information sets, said sectional information sets, and said personal information sets, in response to a relevant retrieval command being input to said information retrieval system.

2. The information retrieval system according to claim 7, wherein said hierarchy information comprises directory information for managing the stored information units in a form of a directory.

3. The information retrieval system according to claim 7, wherein said network comprises a tree network.

4. The information retrieval system according to claim 7, wherein said hierarchy information comprises is used for managing the stored information units so that said stored information units constitute a tree network.

5. The information retrieval system according to claim 7, wherein said hierarchy information is used for managing the stored information units so that said stored information units are arranged in order from a most generic information units(s) to b most specific information unit(s).

6. The information retrieval system according to claim 7, wherein said automatic retrieval means searches the stored information units so that:

if desired information cannot be retrieved from information units managed by a certain management means belonging to a first management-means hierarchies, a predetermined management means is selected from a plurality of management means belonging to a second management means hierarchy among said plurality of management-means hierarchies; and then, a search operation is performed on information units managed by the selected management means belonging to said second management-means hierarchy.

7. The information retrieval system according to claim 1, wherein:

said automatic retrieval means comprises:

first searching means for searching said personal information sets in response to said retrieval command which has been input to one of said plurality of personal-information managing means;

first requesting means for requesting, if the search performed by said first searching means does not result in the retrieval of said predetermined information unit, a further search to be performed on a set of said sectional information sets by an appropriate one of said plurality of sectional-information managing means, said appropriate one of said plurality of sectional-information managing means being selected in accordance with a hierarchy information set among said hierarchy information, said hierarchy information set being previously stored in one of said plurality of personal-information storing means associated with said one of said plurality of personal-information managing means, and said set of said sectional information sets being one stored in said one of said plurality of sectional-information storing means;

second searching means, provided for said plurality of sectional-information managing means, for searching said set of said sectional information sets in response to the request made by said first requesting means;

second requesting means for requesting, if the search performed by said second searching means does not result in the retrieval of said predetermined information unit, a further search to be performed on a set of said general information sets by an appropriate one of said plurality of general-information managing means in a case where there are a plurality of general-information managing means, said appropriate one of said plurality of general-information managing means being selected in accordance with a hierarchy information set among said hierarchy information, said hierarchy information set being previously stored in one of said plurality of sectional-information storing means associated with said appropriate one of said plurality of sectional-information managing means, and said set of said general information sets being one stored in said one of said plurality of general-information storing means;

third searching means, provided for said plurality of general-information managing means, for searching said set of said general information sets in response to the request made by said second requesting means; and wherein the retrieval of said predetermined information unit is made in a bottom-up searching manner in which the personal information set is searched first; the sectional information set is searched second; and the general information set is searched last.

8. The information retrieval system according to claim 7, wherein:

each of said first, second and third searching means uses an inverted file previously stored in a respective one of the personal-information storing means, sectional-information storing means and general-information storing means;

each said inverted file is previously generated based on a respective one among the personal information set, sectional information set and general information set;

each said inverted file comprises information concerning keywords corresponding to respective information units to be retrieved, information concerning the stored location of the respective information units to be retrieved, and information concerning a connection between each information unit and the corresponding keyword; and each of said first, second and third searching means retrieves said predetermined information unit by searching the keywords in said inverted information for the keyword corresponding to said predetermined information unit, said keyword being input together with said retrieval command.

9. The information retrieval system according to claim 7, wherein:

each of said first, second and third searching means uses a search file previously stored in a respective one of the personal-information storing means, sectional-information storing means and general-information storing means;

each said search file is previously generated as a result of compressing a respective one among the personal information set, sectional information set and general information set; and each of said first, second and third searching means searches substantially through all information units for said predetermined information unit based on a respective one of said search files.

10. The information retrieval system according to claim 1, wherein:

each of said sectional information comprises a partial set of said general information; and each of said personal information comprises a partial set of one of said general information and said sectional information.

11. The information retrieval system according to claim 1, wherein:

said sectional-information storing means comprises a disc device; and the hierarchy information set is stored on a replaceable disc.

12. The information retrieval system according to claim 1, wherein:

said automatic retrieval means comprises:

first searching means for searching said general information set in response to said retrieval command;

first requesting means for requesting, if the search performed by said first searching means does not result in the retrieval of said predetermined information unit, a further search to be performed on a set of said sectional information sets by an appropriate one of said plurality of sectional-information managing means, said appropriate one of said plurality of sectional-information managing means being selected in accordance with a hierarchy information set among said hierarchy information, said hierarchy information set being previously stored in general-information storing means and said set of said sectional information sets being one stored in said one of said plurality of sectional-information storing means;

second searching means, provided for said plurality of sectional-information managing means, for searching said set of said sectional information sets in response to the request made by said first requesting means;

second requesting means for requesting, if the search performed by said second searching means does not result in the retrieval of said predetermined information unit, a further search to be performed on a set of said personal information sets by an appropriate one of said plurality of personal-information managing means, said appropriate one of said plurality of personal-information managing means being selected in accordance with a hierarchy information set among said hierarchy information, said hierarchy information set being previously stored in one of said plurality of sectional-information storing means associated with said appropriate one of said plurality of sectional-information managing means, and said set of said personal information sets being one stored in said one of said plurality of personal-information storing means;

third searching means, provided for said plurality of personal-information managing means, for searching said set of said personal information sets in response to the request made by said second requesting means; and wherein the retrieval of said predetermined information unit is made in a top-down searching manner in which the general information set is searched first; the sectional information set is searched second; and the personal information set is searched last.

13. The information retrieval system according to claim 12, wherein:

each of said first, second and third searching means uses an inverted file previously stored in a respective one of the personal-information storing means, sectional-information storing means and general-information storing means;

each said inverted file is previously generated based on a respective one among the personal information set, sectional information set and general information set;

each said inverted file comprises information concerning keywords corresponding to the respective information units to be retrieved, information concerning the stored location of the respective information units to be retrieved, and information concerning a connection between each information unit and the corresponding keyword; and each of said first, second and third searching means retrieves said predetermined information unit by searching the keywords in said inverted information for the keyword corresponding to said predetermined information unit, said keyword being input together with said retrieval command.

14. The information retrieval system according to claim 12, wherein:

each of said first, second and third searching means uses a search file previously stored in a respective one of the personal-information storing means, sectional-information storing means and general-information storing means;

each said search file is previously generated as a result of compressing a respective one among the personal information set, sectional information set and general information set; and each of said first, second and third searching means searches substantially through the entirety of information units for said predetermined information unit based on the respective one of said search files.

15. An information retrieval apparatus, which is connected to other information retrieval apparatuses via a network;

said information retrieval apparatus comprising:

retrieval information storing means for storing therein sets of retrieval information to be retrieved;

directory information storing means for storing therein directory information, said directory information indicating one of said other information retrieval apparatuses to which a retrieval request is sent if a set of retrieval information specified by said retrieval request is not present in said retrieval information storing means;

retrieval request receiving means for receiving a retrieval request, sent from one of said other information retrieval apparatuses;

information retrieving means for searching, according to said retrieval request received by said receiving means, said retrieval information storing means so as to retrieve a set of retrieval information;

retrieval result sending means for sending said set of retrieval information to said one of said other information retrieval apparatuses; and search requesting means for sending, via said network, a retrieval request to one of said other information retrieval apparatuses if a set of retrieval information specified by said retrieval request is not present in said retrieval information storing means, said one of said other information retrieval apparatuses being determined according to said directory information stored in said directory information storing means.

16. The information retrieval apparatus according to claim 15, wherein magneto-optical discs, read/write heads for reading from/writing to said discs, and read/write controller for controlling said read/write heads comprise said retrieval information storing means and said directory information storing means.

17. The information retrieval apparatus according to claim 15, further comprising inverted files which are used to retrieve a set of retrieval information among said sets of retrieval information stored in said retrieval information storing means;

said inverted files comprising keywords accompanied by position indicating information indicating positions at which said sets of retrieval information are stored in said retrieval information storing means, respectively.

18. The information retrieval apparatus according to claim 15, further comprising search files which are used to retrieve a set of retrieval information among said sets of retrieval information stored in said retrieval information stored in said retrieval information storing means;

said search files comprising information obtained as a result of compressing said sets of retrieval information.

19. The information retrieval apparatus, according to claim 15, wherein:

said retrieval request comprises a keyword; and said keyword is used in a searching operation performed by said information retrieving means.

20. An information retrieval system comprising a plurality of information retrieval apparatuses, said plurality of information retrieval apparatuses being connected to one another via a network;

each information retrieval apparatus of said plurality of information retrieval apparatuses comprising:

retrieval information storing means for storing therein sets of retrieval information to be retrieved;

directory information storing means for storing therein directory information, said directory information indicating one of said other information retrieval apparatuses of said plurality of information retrieval apparatuses to which a retrieval request is sent if a set of retrieval information specified by said retrieval request is not present in said retrieval information storing means;

retrieval request receiving means for receiving a retrieval request, sent from one of said other information retrieval apparatuses;

information retrieving means; for searching, according to said retrieval request received by said receiving means, said retrieval information storing means so as to retrieve a set of retrieval information;

retrieval result sending means for sending said set of retrieval information to said one of said other information retrieval apparatuses; and search requesting means for sending, via said network, a retrieval request to one of said other information retrieval apparatuses if a set of retrieval information according to said retrieval request is not present in said retrieval information storing means, said one of said other information retrieval apparatuses being indicated by said directory information stored in said directory information storing means.

21. The information retrieval system according to claim 20, wherein in said network, which one of said other information retrieval apparatuses a retrieval request is to be sent to if a set of retrieval request is to be sent to if a set of retrieval information specified by said retrieval request is not present in said retrieval information storing means, is alterable by appropriately changing said directory information stored in said directory information storing means.

22. The information retrieval system according to claim 20, wherein in said network, there is a path in said network to directly connect any pair of information retrieval apparatuses among said plurality of information retrieval apparatuses.

23. The information retrieval system, according to claim 20, wherein:

said retrieval request comprises; a keyword; and said keyword is used in a searching operation performed by said information retrieving means.

\* \* \* \* \*